US011119585B2

(12) United States Patent
Chen et al.

(10) Patent No.: US 11,119,585 B2
(45) Date of Patent: Sep. 14, 2021

(54) DUAL-MODE AUGMENTED REALITY INTERFACES FOR MOBILE DEVICES

(71) Applicant: Ford Motor Company, Dearborn, MI (US)

(72) Inventors: Yifan Chen, Ann Arbor, MI (US); Pramita Mitra, Bloomfield Hills, MI (US); Gary Steven Strumolo, Canton, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 0 days.

(21) Appl. No.: 16/340,502

(22) PCT Filed: Oct. 13, 2016

(86) PCT No.: PCT/US2016/056770
§ 371 (c)(1),
(2) Date: Apr. 9, 2019

(87) PCT Pub. No.: WO2018/071019
PCT Pub. Date: Apr. 19, 2018

(65) Prior Publication Data
US 2019/0235644 A1 Aug. 1, 2019

(51) Int. Cl.
*G06F 3/0346* (2013.01)
*H04N 21/431* (2011.01)
(Continued)

(52) U.S. Cl.
CPC .......... *G06F 3/0346* (2013.01); *G06F 1/1626* (2013.01); *G06F 1/1686* (2013.01);
(Continued)

(58) Field of Classification Search
CPC .... G06F 3/0346; G06F 1/1626; G06F 1/1686; G06F 3/011; G06K 9/00671;
(Continued)

(56) References Cited

U.S. PATENT DOCUMENTS 8,872,854 B1 * 10/2014 Levitt ................. G06F 3/04815
345/633
9,385,324 B2   7/2016 Wu et al.
(Continued)

FOREIGN PATENT DOCUMENTS

| CN | 105739849 | 7/2016 |
| DE | 102014005983 | 9/2014 |
| WO | 2018071019 | 4/2018 |

OTHER PUBLICATIONS

International Searching Authority, "International Search Report and Written Opinion," issued in connection with International Patent Application No. PCT/US2016/056770, dated Jan. 10, 2017, 17 pages.

(Continued)

*Primary Examiner* — Jin Ge
(74) *Attorney, Agent, or Firm* — Brandon Hicks; Hanley, Flight & Zimmerman, LLC

(57) ABSTRACT

Dual-mode augmented reality interfaces for mobile devices are disclosed herein. A dual-mode augmented reality interface of a mobile device includes a first mode to be presented via a user interface of the mobile device in response to detecting an occurrence of a first motion of the mobile device. The dual-mode augmented reality interface further includes a second mode to be presented via the user interface in response to detecting an absence of the first motion. The second mode is different from the first mode. The first mode may be a browsing mode, and the second mode may be a learning mode. The first motion may be a panning motion.

30 Claims, 9 Drawing Sheets

(51) Int. Cl.

| | | |
|---|---|---|
| *H04N 21/414* | (2011.01) | |
| *H04N 21/4223* | (2011.01) | |
| *G06F 1/16* | (2006.01) | |
| *G06F 3/01* | (2006.01) | |
| *H04N 21/44* | (2011.01) | |
| *G06K 9/00* | (2006.01) | |
| *H04B 1/3827* | (2015.01) | |
| *H04N 5/262* | (2006.01) | |

(52) U.S. Cl.
CPC ............ *G06F 1/1694* (2013.01); *G06F 3/011* (2013.01); *G06K 9/00671* (2013.01); *H04B 1/3833* (2013.01); *H04N 5/2628* (2013.01); *H04N 21/41407* (2013.01); *H04N 21/4223* (2013.01); *H04N 21/4316* (2013.01); *H04N 21/44008* (2013.01)

(58) Field of Classification Search
CPC ............... H04B 1/3833; H04N 5/2628; H04N 21/41407; H04N 21/4223; H04N 21/4316; H04N 21/44008
USPC .......................................................... 345/633
See application file for complete search history.

(56) References Cited

U.S. PATENT DOCUMENTS

| | | | | |
|---|---|---|---|---|
| 9,652,031 | B1* | 5/2017 | Savastinuk | ............. G06F 3/012 |
| 2007/0268246 | A1 | 11/2007 | Hyatt | |
| 2008/0140338 | A1* | 6/2008 | No | ........................ G06F 1/3206 702/141 |
| 2010/0235667 | A1 | 9/2010 | Mucignat et al. | |
| 2011/0285794 | A1* | 11/2011 | Jilani | ................... B41J 2/14282 347/71 |
| 2012/0009982 | A1* | 1/2012 | Dunko | ................... G06F 1/1613 455/566 |
| 2012/0246027 | A1 | 9/2012 | Martin | |
| 2012/0324213 | A1 | 12/2012 | Ho et al. | |
| 2013/0016102 | A1* | 1/2013 | Look | ....................... G06T 15/20 345/426 |
| 2013/0036377 | A1* | 2/2013 | Colley | ................... G06F 3/0485 715/764 |
| 2014/0245202 | A1* | 8/2014 | Yoon | ..................... G06F 3/0482 715/765 |
| 2014/0361988 | A1 | 12/2014 | Katz et al. | |
| 2015/0202962 | A1 | 7/2015 | Habashima et al. | |
| 2015/0278999 | A1 | 10/2015 | Summers et al. | |
| 2015/0356788 | A1* | 12/2015 | Abe | ....................... A63F 13/428 345/633 |
| 2016/0035138 | A1* | 2/2016 | Kim | ....................... H04N 5/265 345/633 |
| 2016/0046300 | A1 | 2/2016 | Wingfield et al. | |
| 2016/0063611 | A1 | 3/2016 | Davis et al. | |
| 2016/0189405 | A1* | 6/2016 | Lyons | ................... G06F 1/1686 345/592 |
| 2017/0322700 | A1* | 11/2017 | Sumner | ............... G06F 3/04815 |
| 2017/0352188 | A1* | 12/2017 | Levitt | .................... G06F 1/1626 |
| 2018/0275772 | A1* | 9/2018 | Bastani | ................. G06F 3/0346 |

OTHER PUBLICATIONS

China National Intellectual Property Administration, "First Office Action," issued in connection with Chinese Patent Application No. 2016800900093, dated Jan. 4, 2021, 11 pages.

* cited by examiner

DUAL-MODE AUGMENTED REALITY INTERFACES FOR MOBILE DEVICES

FIELD OF THE DISCLOSURE

This disclosure relates generally to augmented reality interfaces and, more particularly, to dual-mode augmented reality interfaces for mobile devices.

BACKGROUND

Conventional augmented reality interfaces of mobile devices are configured to present a user of the mobile device with a modified and/or augmented video captured via a camera of the mobile device. The modified and/or augmented video is presented in real time on the mobile device, and typically includes information pertaining to and/or associated with an object of interest included within the captured video. For example, an augmented reality interface of a mobile device may present an augmented video of a vehicle, where the augmented video includes information (e.g., text, a graphic, a link to an audio file, a link to a video file, etc.) about a feature (e.g., a headlight, a side view mirror, a wheel, etc.) of the vehicle layered over the video of the vehicle as captured by the camera of the mobile device.

SUMMARY

Dual-mode augmented reality interfaces for mobile devices are disclosed herein. In some disclosed examples, a dual-mode augmented reality interface of a mobile device comprises a first mode to be presented via a user interface of the mobile device in response to detecting an occurrence of a first motion of the mobile device. In some disclosed examples, dual-mode augmented reality interface comprises a second mode to be presented via the user interface in response to detecting an absence of the first motion. In some disclosed examples, the second mode is different from the first mode.

In some examples, a method for presenting a dual-mode augmented reality interface of a mobile device is disclosed. In some disclosed examples, the method comprises presenting a first mode of the dual-mode augmented reality interface via a user interface of the mobile device in response to detecting an occurrence of a first motion of the mobile device. In some disclosed examples, the method comprises presenting a second mode of the dual-mode augmented reality interface via the user interface in response to detecting an absence of the first motion. In some disclosed examples, the second mode is different from the first mode.

In some examples, a tangible machine readable storage medium comprising instructions is disclosed. In some disclosed examples, the instructions, when executed, cause a processor to present a first mode of a dual-mode augmented reality interface of a mobile device via a user interface of the mobile device in response to detecting an occurrence of a first motion of the mobile device. In some disclosed examples, the instructions, when executed, cause the processor to present a second mode of the dual-mode augmented reality interface via the user interface in response to detecting an absence of the first motion. In some disclosed examples, the second mode is different from the first mode.

Figure 1:
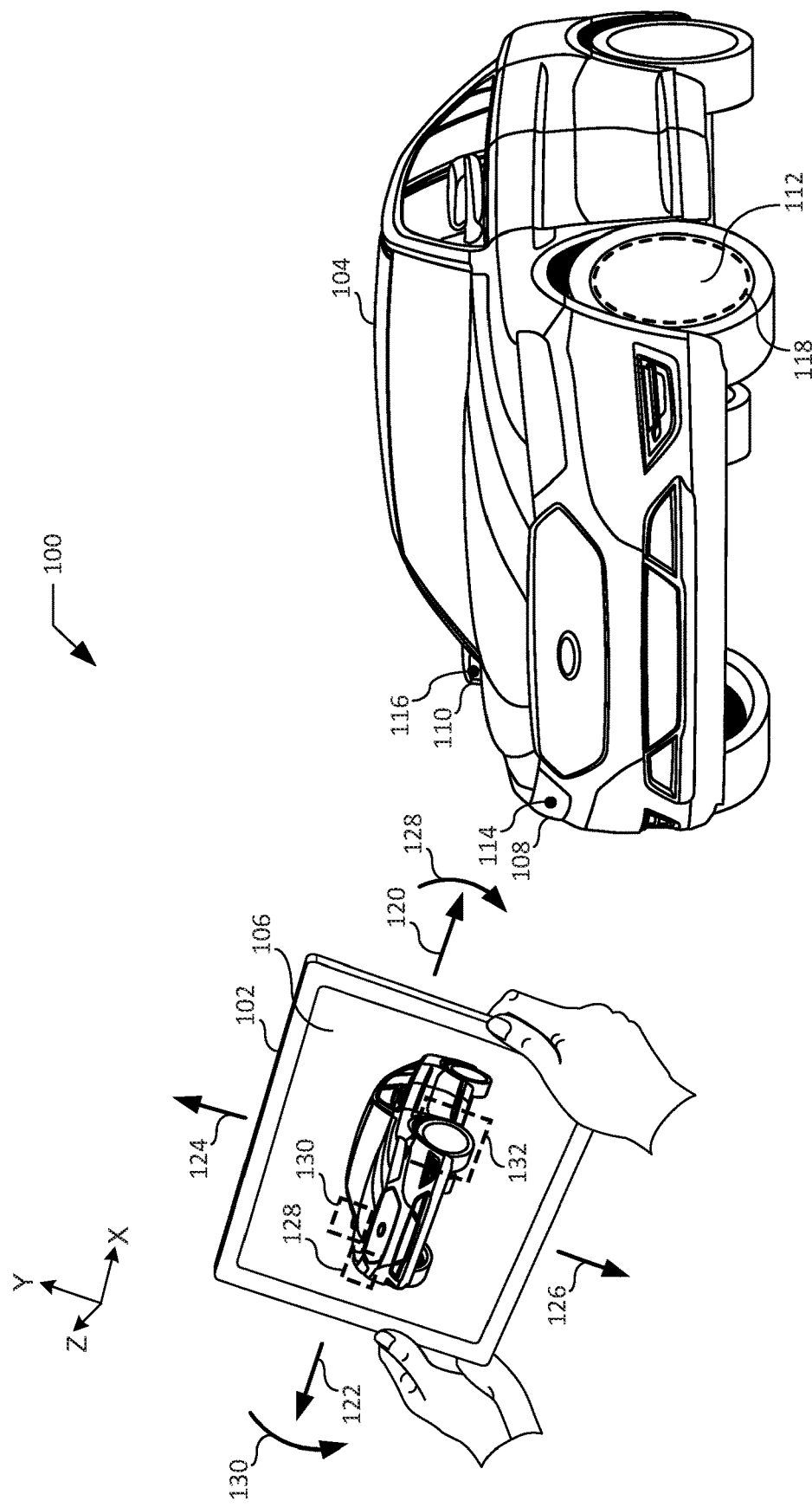
FIG. 1 illustrates an example mobile device constructed in accordance with the teachings of this disclosure shown in an example environment of use in which the mobile device is presenting an example browsing mode of an example dual-mode augmented reality interface executing on the mobile device.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Conventional augmented reality interfaces of mobile devices are configured to present a user of the mobile device with real-time video captured via a camera of the mobile device, with the captured video being modified and/or augmented to include information (e.g., text, a graphic, a link to an audio file, a link to a video file, etc.) layered over the captured video. The overlaid information typically pertains to and/or is associated with a feature and/or an object of interest included within the captured video. While the presentation of real-time video to the user in conjunction with such conventional augmented reality interfaces is useful for when the user is searching for, browsing for, and/or otherwise endeavoring to locate one or more feature(s) and/or object(s) positioned within an environment of use of the augmented reality interface, the presentation of such real-time video is not particularly suitable or useful once the user ceases searching and/or browsing and instead begins to consume and/or learn about the located feature(s) and/or object(s).

For example, the overlaid information may be out of sync with the real-time video as a result of processing constraints of the augmented reality application and/or the mobile device on which the augmented reality application is executing. Moreover, even when in sync with the real-time video, the overlaid information may be difficult for the user to comprehend as a result of the overlaid information being positioned in a manner that overlaps, obstructs and/or otherwise interferes with one or more of the feature(s) and/or the object(s) of interest included within the captured video. Such disadvantages of conventional augmented reality interfaces provide for poor user experiences.

Unlike conventional augmented reality interfaces that restrictively operate and/or execute in a single mode, example dual-mode augmented reality interfaces for mobile devices disclosed herein advantageously operate and/or execute in a first mode (e.g., a browsing mode) in response to detecting an occurrence of a panning motion of the mobile device, and a second mode (e.g., a learning mode) in response to detecting an absence of a panning motion of the mobile device. In some disclosed examples, the second mode of the dual-mode augmented reality interface, when presented, advantageously includes an optimized layout comprising a configured version of an image captured by the camera of the mobile device, and further comprising configured associated information corresponding to a marker or a feature detected in the image. In some disclosed examples, the configured version of the image includes at least one of a modified size or a modified position of an object of interest modified relative to a size or a position of the object of interest within the image as captured. In some disclosed examples, the configured associated information overlays the configured version of the image without obstructing the object of interest contained therein. Thus, the disclosed dual-mode augmented reality interfaces remedy the disadvantages that arise from single-mode conventional augmented reality interfaces which present a user with modified and/or augmented real-time video in all instances.

As used herein, the term "panning motion" in relation to a mobile device refers generally to a motion and/or a movement of the mobile device along either of an x-axis or a y-axis of an x-y-z coordinate system associated with the mobile device, and/or a rotation of the mobile device about a z-axis of the x-y-z coordinate system associated with the mobile device, as is generally illustrated and described below in connection with FIG. 1. As used herein, the term "zooming motion" in relation to a mobile device refers generally to a motion and/or a movement of the mobile device along a z-axis of an x-y-z coordinate system associated with the mobile device, as is generally illustrated and described below in connection with FIG. 2. As used herein, the term "steadiness" in relation to a mobile device refers generally to an absence of motion and/or movement of the mobile device. A steadiness of the mobile device may in some instances be indicated by a concurrent absence of both a panning motion and a zooming motion of the mobile device. As used herein, the term "browsing mode" refers to an example first mode of the dual-mode augmented reality interface described below in connection with FIGS. 1 and 3, the first mode being presented in response to detecting an occurrence of a panning motion of the mobile device. As used herein, the term "learning mode" refers to an example second mode of the dual-mode augmented reality interface described below in connection with FIGS. 2 and 3, the second mode being presented in response to detecting an absence of a panning motion of the mobile device.

FIG. 1 illustrates an example mobile device 102 constructed in accordance with the teachings of this disclosure shown in an example environment of use 100 in which the mobile device 102 is presenting an example browsing mode (e.g., a first mode) of an example dual-mode augmented reality interface executing on the mobile device 102. The example environment of use 100 includes the mobile device 102 and an example object of interest 104.

The mobile device 102 of FIG. 1 includes an example camera (not shown) for capturing images and/or video of the object of interest 104, and an example display 106 for presenting the captured images and/or video. In the illustrated example of FIG. 1, the mobile device 102 is a tablet and the display 106 is a touchscreen display. The mobile device may alternatively be implemented as a smartphone, a laptop computer and/or any other type of hand-held computing device having a camera for capturing images and/or video and a display for presenting the captured images and/or video. Positioning and movement of the mobile device 102 within the environment of use 100 is controlled by an end user carrying and/or holding the mobile device 102, as is generally shown in FIG. 1.

The object of interest 104 of FIG. 1 includes a first example feature 108, a second example feature 110, and a third example feature 112. In the illustrated example of FIG. 1, the object of interest 104 is a vehicle, the first example feature 108 is a headlight of the vehicle, the second example feature 110 is a side view mirror of the vehicle, and the third example feature 112 is a wheel of the vehicle. Although the example object of interest 104 is illustrated in FIG. 1 as a vehicle having first, second and third features 108, 110, 112, the object of interest 104 may alternatively be any type of object and/or may contain any number (e.g., 1, 2, 10, 50, etc.) of features.

In the illustrated example of FIG. 1, the object of interest 104 also includes a first example marker 114 and a second example marker 116. The first example marker 114 is mounted on and/or coupled to the first example feature 108, and the second example marker 116 is mounted on and/or coupled to the second example feature 110. In the illustrated example of FIG. 1, the first and second markers 114, 116 are implemented as QR codes that are unique to corresponding ones of the first and second features 108, 110 to which the first and second markers 114, 116 are respectively mounted and/or coupled. For example, the first marker 114 may be a QR code containing information that is indicative of and/or that pertains to the first feature 108 (e.g., the headlight) of the object of interest 104 (e.g., the vehicle). In other examples, the first and second markers 114, 116 may alternatively be implemented as individual dots, patterned images, and/or any other marker structures capable of being captured via a camera and containing information indicative of and/or pertaining to features (e.g., the first and second features 108, 110) of the object of interest 104.

In the illustrated example of FIG. 1, the object of interest 104 also includes an example feature shape 118 that is unique to the third example feature 112. For example, the feature shape 118 may be a circular and/or elliptical shape that corresponds to the third feature 112 (e.g., the wheel) of the object of interest 104 (e.g., the vehicle).

The mobile device 102 executes a dual-mode augmented reality interface that includes a browsing mode (e.g., a first mode). When the dual-mode augmented reality interface is executing in browsing mode (as shown in FIG. 1), the display 106 of the mobile device 102 presents video (e.g., real-time video) of the object of interest 104 captured by the camera of the mobile device 102. As further described herein, the dual-mode augmented reality interface modifies and/or augments the video of the object of interest 104 being presented via the display 106 to include first, second and third example indicators 128, 130, 132 and/or associated information corresponding to the first and second markers 114, 116, the feature shape 118, and/or the first, second and third features 108, 110, 112 of the object of interest 104.

The mobile device 102 executes the dual-mode augmented reality interface in browsing mode (as shown in FIG. 1) in response to detecting the occurrence of one or more panning motion(s) (e.g., panning movement(s)) of the mobile device 102. For example, an end user may pan the mobile device 102 to the right (as indicated by the first example arrow 120 of FIG. 1) or to the left (as indicated by the second example arrow 122 of FIG. 1) along a first axis (e.g., the x-axis) of a coordinate system associated with the mobile device 102. As another example, an end user may additionally and/or alternatively pan the mobile device 102 upward (as indicated by the third example arrow 124 of FIG. 1) or downward (as indicated by the fourth example arrow 126 of FIG. 1) along a second axis (e.g., the y-axis) of the coordinate system. As another example, an end user may additionally and/or alternatively pan the mobile device 102 clockwise (as indicated by the fifth example arrow 128 of FIG. 1) or counterclockwise (as indicated by the sixth example arrow 130 of FIG. 1) about a third axis (e.g., the z-axis) of the coordinate system. As further described herein, the mobile device 102 detects the occurrence of such panning motion(s). In response to detecting the occurrence of such panning motion(s), the mobile device 102 causes the dual-mode augmented reality interface to execute in browsing mode (e.g., the first mode of the dual-mode augmented reality interface).

Figure 2:
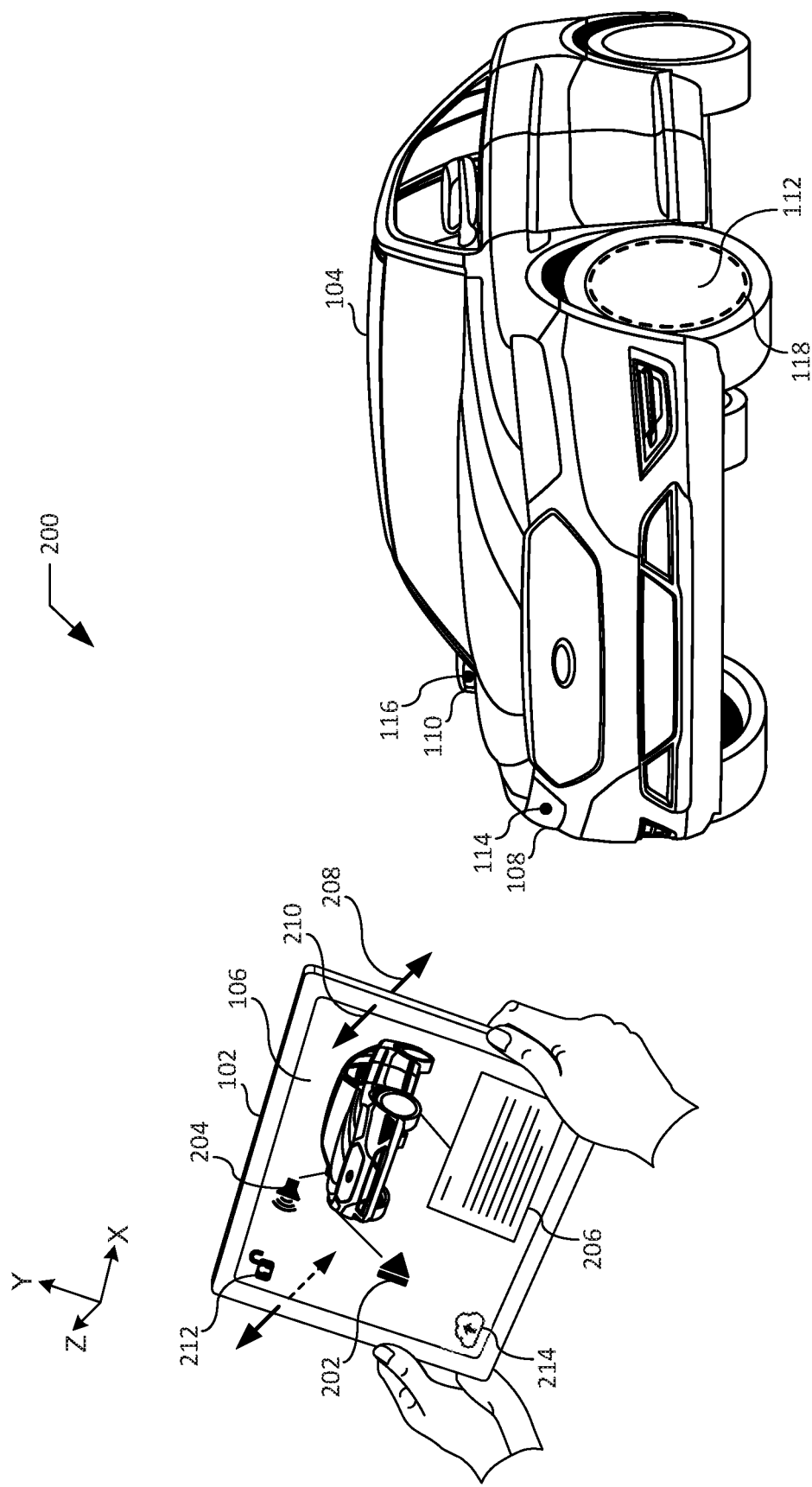
FIG. 2 illustrates the example mobile device of FIG. 1 in an example environment of use in which the mobile device is presenting an example learning mode of the example dual-mode augmented reality interface executing on the mobile device.

FIG. 2 illustrates the example mobile device 102 of FIG. 1 in an example environment of use 200 in which the mobile device 102 is presenting an example learning mode (e.g., a second mode) of the example dual-mode augmented reality interface executing on the mobile device 102. When the dual-mode augmented reality interface is executing in learning mode (as shown in FIG. 2), the display 106 of the mobile device 102 presents an image (e.g., a high-resolution image) of the object of interest 104 captured by the camera of the mobile device 102. As further described herein, the dual-mode augmented reality interface modifies and/or augments the image of the object of interest 104 being presented via the display 106 to optimize and/or configure the size and/or position of the object of interest 104 within the display 106, and/or to optimize and/or configure the layout and/or positioning of fourth, fifth and sixth example indicators 202, 204, 206 and/or associated information corresponding to the first and second markers 114, 116, the feature shape 118, and/or the first, second and third features 108, 110, 112 of the object of interest 104 relative to the size and/or position of the object of interest 104 as presented on the display 106.

For example, the mobile device 102 may position the fourth, fifth and sixth indicators 202, 204, 206 and/or associated information corresponding to the first, second and third features 108, 110, 112 of the object of interest 104 as presented on the display 106 such that the fourth, fifth and sixth indicators 202, 204, 206 and/or associated information do/does not overlap, obstruct and/or otherwise interfere with the object of interest 104 as presented on the display 106. The mobile device 102 may additionally and/or alternatively position the fourth indicator 202 and/or information associated with the fourth indicator 202 corresponding to the first feature 108 of the object of interest 104 as presented on the display 106 such that the fourth indictor 202 and/or associated information does not overlap, obstruct and/or otherwise interfere with the fifth or sixth indictors 204, 206 and/or information associated with the fifth or sixth indictors 204, 206 corresponding to the second and/or third features 110, 112 of the object of interest 104 as presented on the display 106.

In the illustrated example of FIG. 2, one or more of the fourth, fifth and/or sixth indicator(s) 202, 204, 206 may be implemented as a selectable link which, upon being selected, causes the display 106 and/or the mobile device 102 to present information pertaining to a corresponding one of the first, second or third features 108, 110, 112 of the object of interest 104. For example, the fourth indicator 202 may be implemented as a selectable link which, when selected, causes the display 106 of the mobile device 102 to present a video file pertaining to the first feature 108 (e.g., the headlight) of the object of interest 104 (e.g., the vehicle). As another example, the fifth indicator 204 may be implemented as a selectable link which, when selected, causes the mobile device 102 to present an audio file pertaining to the second feature 110 (e.g., the side view mirror) of the object of interest 104 (e.g., the vehicle).

The mobile device 102 executes the dual-mode augmented reality interface in learning mode (as shown in FIG. 2) in response to detecting an absence of the panning motion(s) of the mobile device 102 as described above in connection with FIG. 1. For example, an end user may hold the mobile device 102 steady without panning and/or moving the mobile device 102 in one or more of the direction(s) corresponding to the first, second, third, fourth, fifth and sixth arrow(s) 120, 122, 124, 126, 128, 130 of FIG. 1. As further described herein, the mobile device 102 detects the absence of panning motion(s), and/or detects the steadiness of the mobile device 102. In response to detecting the absence of such panning motion(s), and/or detecting such steadiness, the mobile device 102 causes the dual-mode augmented reality interface to execute in learning mode (e.g., the second mode of the dual-mode augmented reality interface).

The mobile device 102 may additionally and/or alternatively execute the dual-mode augmented reality interface in learning mode (as shown in FIG. 2) in response to detecting the occurrence of one or more zooming motion(s) (e.g., zooming movement(s)) of the mobile device 102 while concurrently detecting the absence of the panning motion(s) of the mobile device 102 described above. For example, an end user may zoom the mobile device 102 toward (as indicated by the seventh example arrow 208 of FIG. 2) or away from (as indicated by the eighth example arrow 210 of FIG. 2) the object of interest 104 along a third axis (e.g., the z-axis) of a coordinate system associated with the mobile device 102. As further described herein, the mobile device 102 detects such zooming motion(s). In response to detecting such zooming motion(s), either alone or in combination with detecting the absence of the panning motion(s) of the mobile device 102 described above, the mobile device 102 causes the dual-mode augmented reality interface to execute in learning mode.

When the dual-mode augmented reality interface is executing in learning mode (as shown in FIG. 2), the display 106 of the mobile device 102 may further present one or more selectable icon(s), button(s) and/or link(s) which, upon being selected, cause the mobile device 102 to perform one or more corresponding operation(s) and/or function(s) associated with the selectable icon(s), button(s) and/or link(s). For example, the display 106 of the mobile device 102 may further present a first example selectable icon 212 which, when selected, causes the mobile device 102 to lock and/or unlock the dual-mode augmented reality interface from executing in learning mode. Selection of the first selectable icon 212 causes the dual-mode augmented reality interface of the mobile device 102 to execute in learning mode even when the mobile device 102 detects the occurrence of one or more panning motion(s) which otherwise would result in the mobile device 102 causing the dual-mode augmented reality interface to execute in browsing mode. As another example, the display 106 of the mobile device 102 may further present a second example selectable icon 214 which, when selected, causes the mobile device 102 to store information and/or data pertaining to the learning mode session to a local memory of the mobile device 102, and/or to transmit information and/or data pertaining to the learning mode session to one or more remote server(s) (e.g., a cloud server) configured to store the information and/or data.

Figure 3:
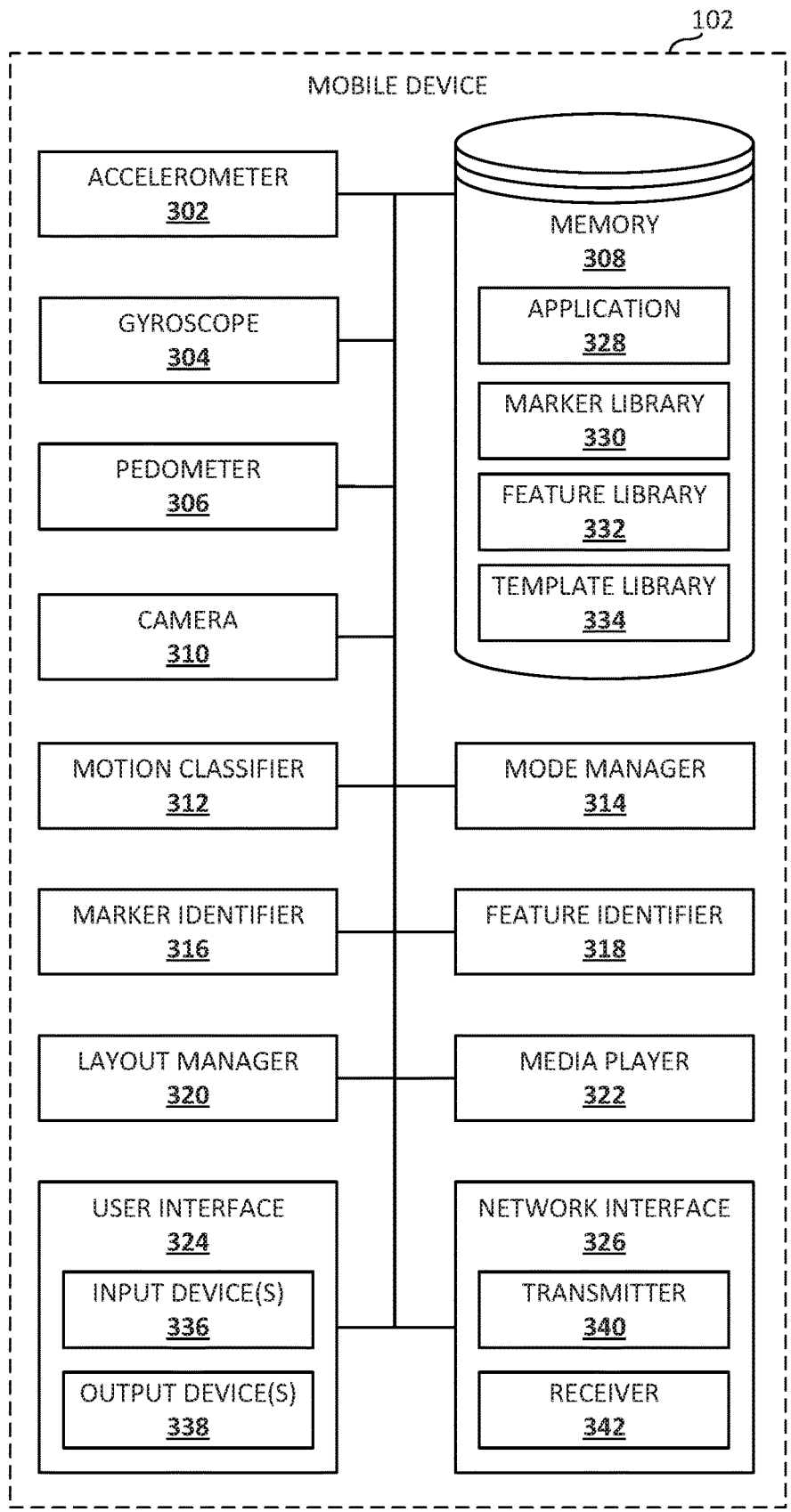
FIG. 3 is a block diagram of the example mobile device of FIGS. 1 and 2.

FIG. 3 is a block diagram of the example mobile device 102 of FIGS. 1 and 2. In the illustrated example of FIG. 3, the mobile device 102 includes an example accelerometer 302, an example gyroscope 304, an example pedometer 306, an example memory 308, an example camera 310, an example motion classifier 312, an example mode manager 314, an example marker identifier 316, an example feature identifier 318, an example layout manager 320, an example media player 322, an example user interface 324 and an example network interface 326. However, other example implementations of the mobile device 102 may include fewer or additional structures in accordance with the teachings of this disclosure. The accelerometer 302, gyroscope 304, pedometer 306, memory 308, camera 310, motion classifier 312, mode manager 314, marker identifier 316, feature identifier 318, layout manager 320, media player 322, user interface 324 and/or network interface 326 of the mobile device 102 of FIGS. 1-3 may be of any size(s), shape(s) and or configuration(s) that enable and/or facilitate the execution and/or presentation of a dual-mode augmented reality interface on the mobile device 102 to one or more end user(s).

The example accelerometer 302 of FIG. 3 senses, measures and/or detects changes in velocity (e.g., acceleration(s)) of the mobile device 102. Different changes in the velocity values sensed, measured and/or detected by the accelerometer 302 correspond to different accelerations of the mobile device 102. Thus, by sensing, measuring and/or detecting changes in the velocity values, the accelerometer 302 makes it possible to calculate velocity values of the mobile device 102. The velocity values may be used to determine the occurrence and/or absence of one or more motion(s) of the mobile device 102 (e.g., the occurrence and/or absence of the panning motion(s) and/or the zooming motion(s) described above in connection with FIGS. 1 and 2). In some examples, velocity values may be calculated based on the acceleration values detected by the accelerometer 302. For example, velocity values may be calculated and/or determined by integrating the acceleration values detected by the accelerometer 302 over time. In some examples, the accelerometer 302 is implemented as a triple-axis accelerometer (e.g., a 3-axis accelerometer) such that the accelerometer 302 senses, measures and/or detects acceleration data for each of three axes of a coordinate system associated with the mobile device 102 (e.g., the three axes of the x-y-z coordinate system associated with the mobile device 102 as illustrated in FIGS. 1 and 2). Acceleration data and/or information sensed, measured and/or detected by the accelerometer 302 may be of any type, form and/or format, and may be stored in a computer-readable storage medium such as the example memory 308 described below.

The example gyroscope 304 of FIG. 3 senses, measures and/or detects angular velocity (e.g., rates of rotation) of the mobile device 102. Different angular velocity values sensed, measured and/or detected by the gyroscope 304 correspond to different rotational movements of the mobile device 102. Thus, by sensing, measuring and/or detecting angular velocity values, the gyroscope 304 detects rate of rotation values associated with the occurrence and/or absence of one or more motion(s) of the mobile device 102 (e.g., the occurrence and/or absence of the panning motion(s) and/or the zooming motion(s) described above in connection with FIGS. 1 and 2). In some examples, the gyroscope 304 is implemented as a triple-axis gyroscope (e.g., a 3-axis gyroscope) such that the gyroscope 304 senses, measures and/or detects rate or rotation data for each of three axes of a coordinate system associated with the mobile device 102 (e.g., the three axes of the x-y-z coordinate system associated with the mobile device 102 as illustrated in FIGS. 1 and 2). Rate of rotation data and/or information sensed, measured and/or detected by the gyroscope 304 may be of any type, form and/or format, and may be stored in a computer-readable storage medium such as the example memory 308 described below.

The example pedometer 306 of FIG. 3 senses, measure and/or detects motion of the mobile device 102 corresponding to walking and/or steps taken by an end user carrying the mobile device 102. Thus, by sensing, measuring and/or detecting walking and/or steps taken by an end user carrying the mobile device 102, the pedometer 306 detects step count data (e.g., a number of steps taken) associated with the occurrence and/or absence of one or more motion(s) of the mobile device 102 (e.g., the occurrence and/or absence of the panning motion(s) and/or the zooming motion(s) described above in connection with FIGS. 1 and 2). For example, the absence of a change in step count data sensed, measured and/or detected by the pedometer over a period of time may indicate that a user carrying the mobile device 102 is stationary and/or not walking, and/or that the user is in the process of focusing the mobile device 102 on the object of interest 104 or a specific feature (e.g. any of the first, second or third features 108, 110, 112 of FIG. 1 described above) of the object of interest 104. Step count data and/or information sensed, measured and/or detected by the pedometer 306 may be of any type, form and/or format, and may be stored in a computer-readable storage medium such as the example memory 308 described below.

The example memory 308 of FIG. 3 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 308 may be stored in any file and/or data structure format, organization scheme, and/or arrangement. In some examples, the memory 308 stores acceleration data sensed, measured and/or detected by the accelerometer 302, rate of rotation data sensed, measured and/or detected by the gyroscope 304, and/or step count data sensed, measured and/or detected by the pedometer 306. The memory 308 is accessible to the motion classifier 312, the mode manager 314, the marker identifier 316, the feature identifier 318, the layout manager 320, the media player 322, the user interface 324 and the network interface 326 of FIG. 3, and/or, more generally, to the mobile device 102 of FIGS. 1 and 2.

In the illustrated example of FIG. 3, the memory 308 includes an example dual-mode augmented reality application 328. The dual-mode augmented reality application 328 of FIG. 3 includes computer-readable instructions that, when executed, cause the mobile device 102 to present a dual-mode augmented reality interface via the display 106 of the mobile device 102 and/or, more generally, via the example user interface 324 of the mobile device 102 described below. The dual-mode augmented reality application 328 provides for a dual-mode augmented reality interface including a first mode corresponding to the browsing mode described above in connection with FIG. 1, and a second mode corresponding to the learning mode described above in connection with FIG. 2.

In the illustrated example of FIG. 3, the memory 308 includes an example marker library 330. The marker library 330 correlates and/or links identifying information of a marker with information and/or data associated with the marker and/or a feature to which the marker corresponds. For example, the marker library 330 may correlate and/or link a QR code that is specific to the first marker 114 of FIGS. 1 and 2 with information and/or data associated with the first marker 114 and/or the first feature 108 (e.g., the headlight of the vehicle) to which the first marker 108 corresponds. The marker library 330 may further correlate and/or link a QR code that is specific to the second marker 116 of FIGS. 1 and 2 with information and/or data associated with the second marker 116 and/or the second feature 110 (e.g., the side view mirror of the vehicle) to which the second marker 110 corresponds. The associated information and/or data may include one or more of text, graphics, audio files and/or video files (and/or links to text, graphics, audio files and/or video files) associated with the marker and/or the feature to which the marker corresponds.

The marker library 330 of FIG. 3 may be implemented as a table, list, matrix and/or any other structured data format, and may include any number of factors and/or fields. The marker library 330 is accessible to the example marker identifier 316 described below. In some examples, the marker library 330 may be stored at a remote server and/or a cloud server rather than being stored within the memory 308 of the mobile device 102. In such examples, the marker identifier 316 of the mobile device 102 may access the marker library 330 via the example network interface 326 of the mobile device 102 described below.

In the illustrated example of FIG. 3, the memory 308 includes an example feature library 332. The feature library 332 correlates and/or links identifying information of a feature (e.g., a feature shape) with information and/or data associated with the feature shape and/or a feature to which the feature shape corresponds. For example, the feature library 332 may correlate and/or link the feature shape 118 of FIGS. 1 and 2 with information and/or data associated with the third feature 112 (e.g., the wheel of the vehicle) to which the feature shape 118 corresponds. The associated information and/or data may include one or more of text, graphics, audio files and/or video files (and/or links to text, graphics, audio files and/or video files) associated with the feature shape and/or the feature to which the feature shape corresponds.

The feature library 332 of FIG. 3 may be implemented as a table, list, matrix and/or any other structured data format, and may include any number of factors and/or fields. The feature library 332 is accessible to the example feature identifier 318 described below. In some examples, the feature library 332 may be stored at a remote server and/or a cloud server rather than being stored within the memory 308 of the mobile device 102. In such examples, the feature identifier 318 of the mobile device 102 may access the feature library 332 via the example network interface 326 of the mobile device 102 described below. In some examples, the feature library 332 may be linked to, related to, and/or otherwise associated with the marker library 330. For example, the feature library 332 and the marker library 330 may be implemented as linked tables within a relational database.

In the illustrated example of FIG. 3, the memory 308 includes an example template library 334. The template library 334 includes one or more layout and/or style template(s) (e.g., graphic design templates), each of which may include one or more arrangement(s) of text and/or graphics. The template library 334 of FIG. 3 may be implemented as a plurality of files, a table, a list, a matrix and/or any other structured data format, and may include any number of templates, factors and/or fields. The template library 334 is accessible to the example layout manager 320 described below. In some examples, the template library 338 may be stored at a remote server and/or a cloud server rather than being stored within the memory 308 of the mobile device 102. In such examples, the layout manager 320 of the mobile device 102 may access the template library 334 via the example network interface 326 of the mobile device 102 described below. In some examples, the template library 334 may be linked to, related to, and/or otherwise associated with the marker library 330 and/or the feature library 332. For example, the template library 334, the feature library 332, and the marker library 330 may be implemented as linked tables within a relational database.

The example camera 310 of FIG. 3 captures images and videos including, for example, images and videos of the example object of interest 104 of FIGS. 1 and 2 described above. The camera 310 may include a CMOS image sensor and associated image and/or video processing circuitry, as are conventionally implemented in mobile devices such as tablets and smartphones. Images and/or videos captured via the camera 310 may be presented in via the example user interface 324 of the mobile device 102 described below. In some examples, video captured by the camera 310 may be presented in real time. In some examples, images and/or videos captured by the camera 310 may be stored within the memory 308 of the mobile device 102. In other examples, images and/or videos captured by the camera 310 may additionally and/or alternatively be stored at a remote server and/or a cloud server. In such other examples, the images and/or videos captured by the camera 310 may be transmitted to the remote server and/or the cloud server via the example network interface 326 of the mobile device 102 described below.

The example motion classifier 312 of FIG. 3 determines and/or classifies the occurrence and/or absence of one or more type(s) of motion(s) and/or movement(s) of the mobile device 102. For example, the motion classifier 312 may determine the occurrence and/or absence of a panning motion, a zooming motion, or a steadiness of the mobile device 102 based on the velocity values calculated from the acceleration values detected by the accelerometer 302 of the mobile device 102, based on the rate of rotation values and/or changes in the rate of rotation values detected by the gyroscope 304 of the mobile device 102, and/or based on the step count data and/or changes in the step count data detected by the pedometer 306 of the mobile device 102.

In some examples, the motion classifier 312 calculates velocity values from the acceleration values detected by the accelerometer 302. For example, the motion classifier 312 may calculate and/or determine velocity values associated with movement of the mobile device 102 by integrating the acceleration values detected by the accelerometer 302 of the mobile device 102 over time. In such examples, the motion classifier 312 may determine the occurrence and/or absence of a panning motion, a zooming motion, or a steadiness of the mobile device 102 based on the velocity values calculated by the motion classifier 312 as derived from the acceleration values and/or changes in the acceleration values detected by the accelerometer 302 of the mobile device 102, based on the rate of rotation values and/or changes in the rate of rotation values detected by the gyroscope 304 of the mobile device 102, and/or based on the step count data and/or changes in the step count data detected by the pedometer 306 of the mobile device 102.

In some examples, the motion classifier 312 of FIG. 3 determines and/or classifies the occurrence and/or absence of one or more type(s) of motion(s) and/or movement(s) of the mobile device 102 by calculating velocity values from the acceleration values detected by the accelerometer 302, and by comparing the velocity values, rate of rotation values obtained from the gyroscope 304, and/or step count data obtained from the pedometer 306 to one or more threshold(s) associated with a panning motion, a zooming motion and/or a steadiness of the mobile device 102. For example, the motion classifier 312 may compare the velocity values derived from the accelerometer 302, the rate of rotation values obtained from the gyroscope 304, and/or the step count data obtained from the pedometer 306 to one or more panning motion threshold(s). In some examples, the panning motion threshold(s) may be specific to data associated with motion of the mobile device 102 in a first direction corresponding to the x-axis of the coordinate system shown in FIGS. 1 and 2 (e.g., as indicated by the first and second example arrows 120, 122 of FIG. 1), motion of the mobile device 102 in a second direction corresponding to the y-axis of the coordinate system shown in FIGS. 1 and 2 (e.g., as indicated by the third and fourth example arrows 124, 126 of FIG. 1), and/or rotational movement of the mobile device 102 about the z-axis of the coordinate system shown in FIGS. 1 and 2 (e.g., as indicated by the fifth and sixth example arrows 128, 130 of FIG. 1). If the velocity values derived from the accelerometer 302, the rate rotation values obtained from the gyroscope 304, and/or the step count data obtained from the pedometer 306 indicate a degree and/or extent of motion of the mobile device 102 that satisfies (e.g., exceeds) one or more of the panning motion threshold(s), the motion classifier 312 classifies the motion of the mobile device 102 as an occurrence of a panning motion. If the velocity values derived from the accelerometer 302, the rate of rotation values obtained from the gyroscope 304, and/or the step count data obtained from the pedometer 306 instead indicate a degree and/or extent of motion of the mobile device 102 that does not satisfy (e.g., does not exceed) any of the panning motion threshold(s), the motion classifier 312 classifies the motion of the mobile device 102 as an absence of a panning motion of the mobile device 102.

As another example, the motion classifier 312 may compare the velocity values derived from the accelerometer 302, the rate of rotation values obtained from the gyroscope 304, and/or the step count data obtained from the pedometer 306 to one or more zooming motion threshold(s). In some examples, the zooming motion threshold(s) may be specific to data associated with motion of the mobile device 102 in a third direction corresponding to the z-axis of the coordinate system shown in FIGS. 1 and 2 (e.g., as indicated by the seventh and eighth example arrows 208, 210 of FIG. 2). If the velocity values derived from the accelerometer 302, the rate of rotation values obtained from the gyroscope 304, and/or the step count data obtained from the pedometer 306 indicate a degree and/or extent of motion of the mobile device 102 that satisfies (e.g., exceeds) any of the zooming motion threshold(s), the motion classifier 312 classifies the motion of the mobile device 102 as an occurrence of a zooming motion. If the velocity values derived from the accelerometer 302, the rate of rotation values obtained from the gyroscope 304, and/or the step count data obtained from the pedometer 306 instead indicate a degree and/or extent of motion of the mobile device 102 that does not satisfy (e.g., does not exceed) any of the zooming motion threshold(s), the motion classifier 312 classifies the motion of the mobile device 102 as an absence of a zooming motion of the mobile device 102.

In some examples, the motion classifier 312 classifies the motion of the mobile device 102 as an occurrence of a steadiness of the mobile device 102 when the velocity values derived from the accelerometer 302, the rate of rotation values obtained from the gyroscope 304, and/or the step count data obtained from the pedometer 306 indicate a degree and/or extent of motion of the mobile device 102 that does not satisfy (e.g., does not exceed) any of the panning motion threshold(s) and any of the zooming motion threshold(s).

As another example, the motion classifier 312 classifies the motion of the mobile device 102 by calculating velocity values from the acceleration values detected by the accelerometer 302, and by comparing the calculated velocity values to determine which aspect of such values is dominant. For example, if the motion classifier 312 determines that velocity value(s) associated with either of the x-axis or the y-axis of the mobile device 102 is/are greater than the velocity value(s) associated with the z-axis of the mobile device 102, the motion classifier 312 determines that such velocity value(s) is/are indicative of a panning motion of the mobile device 102. If the motion classifier 312 instead determines that velocity value(s) associated with either of the x-axis or the y-axis of the mobile device 102 is/are not greater than the velocity value(s) associated with the z-axis of the mobile device 102, the motion classifier 312 determines whether the rate of rotation value(s) associated with the z-axis of the mobile device 102 is/are greater than the rate of rotation value(s) associated with the x-axis and the y-axis of the mobile device 102. If the motion classifier 312 determines that rate of rotation value(s) associated with the z-axis of the mobile device 102 is/are greater than the rate of rotation value(s) associated with the x-axis and the y-axis of the mobile device 102, the motion classifier 312 determines that such rate of rotation value(s) is/are indicative of a panning motion of the mobile device 102. If the motion classifier 312 instead determines that rate of rotation value(s) associated with the z-axis of the mobile device 102 is/are not greater than the rate of rotation value(s) associated with the x-axis and the y-axis of the mobile device 102, the motion classifier 312 determines whether the rate of rotation values associated with the x-axis, the y-axis and/or the z-axis of the mobile device 102 satisfy (e.g., exceed) one or more rate of rotation threshold(s). If the motion classifier 312 determines that one or more of the rate of rotation values associated with any of the x-axis, the y-axis and/or the z-axis of the mobile device 102 satisfy any of the rate of rotation threshold(s), the motion classifier 312 determines that such rate of rotation value(s) is/are indicative of a panning motion of the mobile device 102. If the motion classifier 312 instead determines that the rate of rotation value(s) associated with the x-axis, the y-axis and the z-axis of the mobile device 102 fail to satisfy any of the rate of rotation threshold(s), the motion classifier 312 determines that the velocity value(s) and the rate of rotation value(s) is/are indicative of a zooming motion of the mobile device 102.

In conjunction with the previous examples, the motion classifier 312 may additionally classify the motion of the mobile device 102 by comparing data and/or values obtained from the pedometer 306. For example, if the motion classifier 312 determines that the step count data obtained from the pedometer 306 is changing (e.g., increasing), the motion classifier 312 determines that such data and/or values indicate that a user carrying the mobile device 102 is walking. The motion classifier 312 may associate such a determination with a classification corresponding to the first mode (e.g., a browsing mode) of the mobile device 102.

The example mode manager 314 of FIG. 3 determines which of the first mode (e.g., the browsing mode of FIG. 1 as described above) or the second mode (e.g., the learning mode of FIG. 2 as described above) of the dual-mode augmented reality interface is to be executed and/or presented via the example user interface 324 of the mobile device 102. The mode manager 314 determines which of the first or second modes is to be executed and/or presented based on the motion classification determined by the motion classifier 312.

For example, if the motion classifier 312 classifies the motion of the mobile device 102 as an occurrence of a panning motion, the mode manager 314 determines that the first mode (e.g., the browsing mode of FIG. 1 as described above) is to be executed and/or presented. In response to making such a determination, the mode manager 314 activates, executes and/or otherwise causes the first mode of the dual-mode augmented reality interface to be presented via the example user interface 324 of the mobile device 102. If the motion classifier 312 instead classifies the motion of the mobile device 102 as an absence of a panning motion, the mode manager 314 determines that the second mode (e.g., the learning mode of FIG. 2 as described above) is to be executed and/or presented. In response to making such a determination, the mode manager 314 activates, executes and/or otherwise causes the second mode of the dual-mode augmented reality interface to be presented via the example user interface 324 of the mobile device 102. In some examples, if the motion classifier 312 classifies the motion of the mobile device 102 as an occurrence of a zooming motion, the mode manager 314 may determine that the second mode (e.g., the learning mode of FIG. 1 as described above) is to be executed and/or presented so long as the motion classifier has not also classified the motion of the mobile device as an occurrence of a panning motion. In response to making such a determination, the mode manager 314 activates, executes and/or otherwise causes the second mode (e.g., the learning mode of FIG. 2 as described above) of the dual-mode augmented reality interface to be presented via the example user interface 324 of the mobile device 102.

The mode manager 314 of FIG. 3 accordingly manages and/or controls transitioning from presentation of the first mode (e.g., the browsing mode) on the mobile device 102 to presentation of the second mode (e.g., the learning mode) on the mobile device 102, and vice-versa. The mode manager 314 bases such transitioning on the motion classifications determined by the motion classifier 312. For example, if the mode manager 314 has caused the first mode to be presented on the mobile device 102 and subsequently receives an indication from the motion classifier 312 corresponding to an absence of a panning motion, the mode manager 314 causes the second mode to be presented in place of the first mode. Similarly, if the mode manager 314 has caused the second mode to be presented on the mobile device 102 and subsequently receives an indication from the motion classifier 312 corresponding to the occurrence of a panning motion, the mode manager 314 causes the first mode to be presented in place of the second mode. As described above, the motion classifier 312 determines such motion classifications in response to motion data (e.g., acceleration data, velocity data, rate of rotation data, and/or step count data) being provided by and/or obtained from the accelerometer 302, the gyroscope 304 and/or the pedometer 306 of the mobile device 102.

The example marker identifier 316 of FIG. 3 identifies markers in the images and videos captured by the camera 310 of the mobile device 102, and further identifies data and/or information (e.g., text, graphics, audio files, video files, etc.) associated with the markers. For example, the marker identifier 316 may identify a first QR code corresponding to the first marker 108 of the object of interest 104 of FIGS. 1 and 2 within an image or video of the object of interest 104 captured by the camera 310 of the mobile device 102. The marker identifier 316 may implement a known form of computer vision and/or image processing to perform the aforementioned identification. The marker identifier 316 may additionally identify information associated with the identified first QR code and/or the identified first marker 108 by accessing the marker library 330 described above. As another example, the marker identifier 316 may identify a second QR code corresponding to the second marker 110 of the object of interest 104 of FIGS. 1 and 2 within an image or video of the object of interest 104 captured by the camera 310 of the mobile device 102. The marker identifier 316 may additionally identify information associated with the identified second QR code and/or the identified second marker 110 by accessing the marker library 330 described above. The marker identifier 316 communicates data corresponding to the identified markers and/or the identified information associated with the identified markers to the example layout manager 320 of the mobile device 102 described below.

The example feature identifier 318 of FIG. 3 identifies features in the images and videos captured by the camera 310 of the mobile device 102, and further identifies data and/or information (e.g., text, graphics, audio files, video files, etc.) associated with the features. For example, the feature identifier 318 may identify a feature shape 118 corresponding to the third feature 112 of the object of interest 104 of FIGS. 1 and 2 within an image or video of the object of interest 104 captured by the camera 310 of the mobile device 102. The feature identifier 318 may implement a known form of computer vision and/or image processing to perform the aforementioned identification. The feature identifier 318 may additionally identify information associated with the identified feature shape 118 and/or the identified third feature 112 by accessing the feature library 332 described above. The feature identifier 318 communicates data corresponding to the identified features and/or the identified information associated with the identified features to the example layout manager 320 of the mobile device 102 described below.

The example layout manager 320 of FIG. 3 generates and/or controls the layout, arrangement and/or organization of data and/or information to be displayed and/or presented via the example user interface 324 of the mobile device 102 in conjunction with the first mode (e.g., the browsing mode) and the second mode (e.g., the learning mode) of the dual-mode augmented reality interface. The layout manager 320 generates the layout, arrangement and/or organization of data and/or information to be displayed and/or presented based on the specific mode (e.g., the first mode or the second mode) of the dual-mode augmented reality interface as determined by the example mode manager 314 of the mobile device 102, and further based on the data communicated to the layout manager 320 by the marker identifier 316 and/or the feature identifier 318 of the mobile device 102.

For example, if the mode manager 314 determines that a first mode (e.g., the browsing mode) of the dual-mode augmented reality interface is to be presented, the layout manager 320 generates a layout that includes video (e.g., real-time video) corresponding to the video captured by the camera 310 of the mobile device 102 overlaid with information (e.g., text, graphics, links to audio files, links to video files, etc.) corresponding to the data communicated to the layout manager 320 by the marker identifier 316 and/or the feature identifier 318. In some examples, the overlaid information may include indicators representative of the data communicated to the layout manager 320 by the marker identifier 316 and/or the feature identifier 318. For example, the overlaid information may include the first, second and third indicators 128, 130, 132 as described above in connection with the browsing mode of FIG. 1.

In instances where the mode manager 314 has determined that the first mode (e.g., the browsing mode) of the dual-mode augmented reality interface is to be presented, the layout manager 320 does not optimize the arrangement and/or organization of the overlaid information relative to any object of interest (e.g., the object of interest 104 of FIG. 1) that may be included within the video captured by the camera 310 of the mobile device 102. Thus, the overlaid information may overlap, obstruct and/or otherwise interfere with the object of interest when the layout generated by the layout manager 320 is presented via the example user interface 324 of the mobile device 102 (e.g., via the display 106 of the mobile device 102 as shown in FIG. 1) in conjunction with the first mode of the dual-mode augmented reality interface.

As another example, if the mode manager 314 determines that a second mode (e.g., the learning mode) of the dual-mode augmented reality interface is to be presented, the layout manager 320 may generate an optimized layout that includes an image captured by the camera 310 of the mobile device 102 overlaid with information (e.g., text, graphics, links to audio files, links to video files, etc.) corresponding to the data communicated to the layout manager 320 by the marker identifier 316 and/or the feature identifier 318. For example, the overlaid information may include the fourth, fifth and sixth indicators 202, 204, 206 as described above in connection with the learning mode of FIG. 2.

In instances where the mode manager 314 has determined that the second mode (e.g., the learning mode) of the dual-mode augmented reality interface is to be presented, the layout manager 320 optimizes the arrangement and/or organization of the overlaid information relative to any object of interest (e.g., the object of interest 104 of FIG. 1) that may be included within the image captured by the camera 310 of the mobile device 102. For example, the layout manager 320 may shift, resize and/or otherwise reposition the object of interest within the image, and may further arrange and/or position the overlaid information relative to the object of interest such that the overlaid information does not overlap, obstruct and/or otherwise interfere with the object of interest when the optimized layout generated by the layout manager 320 is presented via the example user interface 324 of the mobile device 102 (e.g., via the display 106 of the mobile device 102 as shown in FIG. 2) in conjunction with the second mode of the dual-mode augmented reality interface.

In some examples, the layout manager 320 may optimize the arrangement and/or organization of the overlaid information by utilizing one or more layout and/or style template(s) (e.g., graphic design templates) accessed from the template library 334 described above.

Layouts and/or optimized layouts generated by the layout manager 320 of FIG. 3 is/are communicated to the example user interface 324 of the mobile device 102 for presentation by the user interface 324. In some examples, the layouts and/or optimized layouts generated by the layout manager 320 may be stored in the example memory 308 of the mobile device 102. In some examples, the layouts and/or optimized layouts generated by the layout manager 320 may be transmitted to an external device (e.g., a remote server or a cloud server) where the layouts and/or optimized layouts may be stored.

The example media player 322 of FIG. 3 presents and/or plays multimedia data and/or files via the example user interface 324 of the mobile device 102 described below. For example, the media player 322 may present and/or play a video file corresponding to the fourth indicator 202 and/or corresponding to the first feature 108 of FIG. 2. The media player 322 may additionally and/or alternatively present and/or play an audio file corresponding to the fifth indicator 204 and/or corresponding to the second feature 110 of FIG. 2. In some examples, the media player 322 may be a Windows Media® Player or a QuickTime® Player. Date and/or files to be played by the media player 322 may be stored within the memory 308 of the mobile device 102, or may alternatively be stored at a remote server and/or a cloud server that is accessible to the mobile device 102 via the example network interface 326 of the mobile device 102 described below.

The example user interface 324 of FIG. 3 facilitates interactions and/or communications between the mobile device 102 and an end user, including the presentation of the first mode (e.g., the browsing mode) and the second mode (e.g., the learning mode) of the dual-mode augmented reality interface to the end user. The user interface 324 includes one or more input device(s) 336 via which the user may input information, data and/or commands to the mobile device 102. For example, the user interface 324 may include a button, a microphone, and/or a touchscreen (e.g., the display 106 of the mobile device 102 of FIGS. 1 and 2) that enable(s) the user to convey information, data and/or commands to the mobile device 102.

The user interface 324 of FIG. 3 also includes one or more output device(s) 338 via which the mobile device 102 presents information and/or data in visual and/or audible form to the end user. For example, the user interface 324 may include a light emitting diode, a touchscreen (e.g., the display 106 of the mobile device 102 of FIGS. 1 and 2), and/or a liquid crystal display for presenting visual information, and/or a speaker for presenting audible information. The first mode (e.g., the browsing mode) and the second mode (e.g., the learning mode) of the dual-mode augmented reality interface described above may be presented via the output device(s) 338 of the user interface 324. Data and/or information presented and/or received via the user interface 324 may be of any type, form and/or format, and may be stored in a computer-readable storage medium such as the example memory 308 described above.

The example network interface 326 of FIG. 3 facilitates interactions and/or communications between the mobile device 102 and one or more external device(s) such as, for example, a remote server and/or a cloud server. The network interface 326 includes an example transmitter 340 via which the mobile device 102 may transmit information, data and/or commands to one or more external device(s). In some examples, the transmitter 340 may transmit data corresponding to one or more image(s) and/or video(s) stored in the memory 308 of the mobile device 102, captured by the camera 310 of the mobile device 102, and/or presented via the user interface 324 of the mobile device 102. In some examples, the transmitter 340 may transmit data corresponding to one or more marker(s) (e.g., a QR code associated with the first marker 114 of FIGS. 1 and 2) identified by the marker identifier 316 of the mobile device 102. In some examples, the transmitter 340 may transmit data corresponding to one or more feature(s) (e.g., a feature shape associated the third feature 112 of FIGS. 1 and 2) identified by the feature identifier 316 of the mobile device 102. In some examples, the transmitter 340 may transmit data corresponding to one or more layout(s) and/or optimized layout(s) stored in the memory 308 of the mobile device 102, generated by the layout manager 320 of the mobile device, and/or presented via the user interface 324 of the mobile device 102.

The network interface 326 of FIG. 3 also includes an example receiver 342 via which the mobile device 102 may receive information, data and/or commands from one or more external device(s). In some examples, the receiver 342 may receive data corresponding to information (e.g., text, a graphic, an audio file, a vide file, etc.) associated with one or more marker(s) identified by the marker identifier 316 of the mobile device 102. In some examples, the receiver 342 may receive data corresponding to information (e.g., text, a graphic, an audio file, a vide file, etc.) associated with one or more feature(s) identified by the feature identifier 316 of the mobile device 102. Data and/or information transmitted and/or received via the network interface 326 may be of any type, form and/or format, and may be stored in a computer-readable storage medium such as the example memory 308 described above.

While an example manner of implementing the example dual-mode augmented reality interface of the example mobile device 102 is illustrated in FIGS. 1-3, one or more of the elements, processes and/or devices illustrated in FIGS. 1-3 may be combined, divided, re-arranged, omitted, eliminated and/or implemented in any other way. Further, the example accelerometer 302, the example gyroscope 304, the example pedometer 306, the example memory 308, the example camera 310, the example motion classifier 312, the example mode manager 314, the example marker identifier 316, the example feature identifier 318, the example layout manager 320, the example media player 322, the example user interface 324, the example network interface 326, the example dual-mode augmented reality application 328, the example marker library 330, the example feature library 332, the example input device(s) 336, the example output device(s) 338, the example transmitter 340 and/or the example receiver 342 of FIG. 3 may be implemented by hardware, software, firmware and/or any combination of hardware, software and/or firmware. Thus, for example, any of the example accelerometer 302, the example gyroscope 304, the example pedometer 306, the example memory 308, the example camera 310, the example motion classifier 312, the example mode manager 314, the example marker identifier 316, the example feature identifier 318, the example layout manager 320, the example media player 322, the example user interface 324, the example network interface 326, the example dual-mode augmented reality application 328, the example marker library 330, the example feature library 332, the example input device(s) 336, the example output device(s) 338, the example transmitter 340 and/or the example receiver 342 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example accelerometer 302, the example gyroscope 304, the example pedometer 306, the example memory 308, the example camera 310, the example motion classifier 312, the example mode manager 314, the example marker identifier 316, the example feature identifier 318, the example layout manager 320, the example media player 322, the example user interface 324, the example network interface 326, the example dual-mode augmented reality application 328, the example marker library 330, the example feature library 332, the example input device(s) 336, the example output device(s) 338, the example transmitter 340 and/or the example receiver 342 is/are hereby expressly defined to include a tangible computer readable storage device or storage disk such as a memory, a digital versatile disk (DVD), a compact disk (CD), a Blu-ray disk, etc. storing the software and/or firmware. Further still, the example mobile device 102 of FIGS. 1-3 may include one or more elements, processes and/or devices in addition to, or instead of, those illustrated in FIGS. 1-3, and/or may include more than one of any or all of the illustrated elements, processes and devices.

Flowcharts representative of example methods for operating and/or executing the example dual-mode augmented reality interface of the example mobile device 102 of FIGS. 1-3 are shown in FIGS. 4-8. In these examples, the methods may be implemented using machine-readable instructions that comprise one or more program(s) for execution by a processor such as the example processor 902 of FIG. 9 shown in the example processor platform 900 discussed below in connection with FIG. 9. The one or more program(s) may be embodied in software stored on a tangible computer readable storage medium such as a CD-ROM, a floppy disk, a hard drive, a digital versatile disk (DVD), a Blu-ray disk, or a memory associated with the processor 902, but the entire program(s) and/or parts thereof could alternatively be executed by a device other than the processor 902 and/or embodied in firmware or dedicated hardware. Further, although the example program(s) is/are described with reference to the flowcharts illustrated in FIGS. 4-8, many other methods for operating and/or executing the example dual-mode augmented reality interface of the example mobile device 102 of FIGS. 1-3 may alternatively be used. For example, the order of execution of the blocks may be changed, and/or some of the blocks described may be changed, eliminated, or combined.

As mentioned above, the example methods of FIGS. 4-8 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 4-8 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
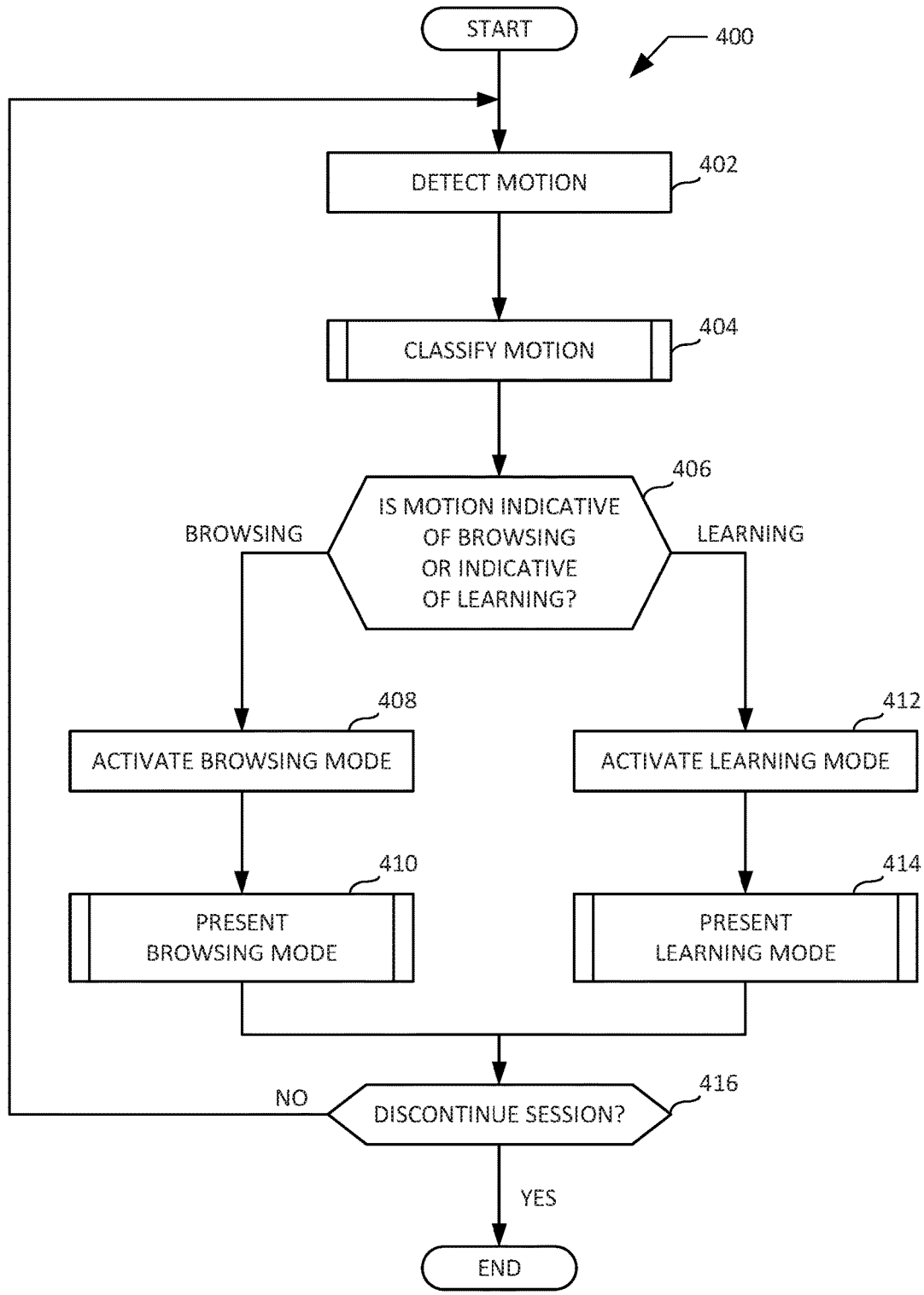
FIG. 4 is a flowchart representative of an example method that may be executed at the example mobile device of FIGS. 1-3 to operate and/or present the example dual-mode augmented reality interface of FIGS. 1-3.

FIG. 4 is a flowchart of an example method 400 that may be executed at the example mobile device 102 of FIGS. 1-3 to operate and/or present the example dual-mode augmented reality interface of FIGS. 1-3. The example method 400 begins when one or more of the example accelerometer 302, the example gyroscope 304 and/or the example pedometer 306 of the mobile device 102 of FIG. 3 sense(s), measure(s) and/or detect(s) motion of the mobile device 102 of FIGS. 1-3 (block 402). For example, the accelerometer 302 may sense, measure and/or detect acceleration values and/or changes in acceleration values associated with the mobile device 102, the gyroscope 304 may sense, measure and/or detect rate of rotation values and/or changes in rate of rotation values associated with the mobile device 102, and the pedometer may sense, measure and/or detect step count data and/or changes in step count data associated with the mobile device 102. Following block 402, control of the example method 400 of FIG. 4 proceeds to block 404.

Based on the motion detected by the accelerometer 302, the gyroscope 304 and/or the pedometer 306 at block 402, the example motion classifier 312 of the mobile device 102 of FIG. 3 classifies the motion of the mobile device 102 of FIGS. 1-3 (block 404). For example, the motion classifier 312 may determine the occurrence and/or absence of a panning motion, a zooming motion, or a steadiness of the mobile device 102 based on the acceleration values and/or changes in the acceleration values detected by the accelerometer 302 of the mobile device 102, based on velocity values and/or changes in the velocity values calculated by the motion classifier 312 as derived from the acceleration values and/or changes in the acceleration values detected by the accelerometer 302 of the mobile device 102, based on the rate of rotation values and/or changes in the rate of rotation values detected by the gyroscope 304 of the mobile device 102, and/or based on the step count data and/or changes in the step count data detected by the pedometer 306 of the mobile device 102. A first example method that may be used to implement block 404 is described in greater detail below in connection with FIG. 5. A second example method that may be used to implement block 404 is described in greater detail below in connection with FIG. 6. Following block 404, control of the example method 400 of FIG. 4 proceeds to block 406.

Based on the classification determined by the motion classifier 312 at block 404, the example mode manager 314 of the mobile device 102 of FIG. 3 determines whether the classification is indicative of a first mode (e.g. a browsing mode) or a second mode (e.g., a learning mode) of the dual-mode augmented reality interface of the mobile device 102 of FIGS. 1-3 (block 406). For example, the mode manager 314 may determine that a classification corresponding to the occurrence of a panning motion is indicative of the first mode (e.g., the browsing mode) of the dual-mode augmented reality interface of the mobile device 102. If the mode manager 314 determines at block 406 that the classification determined by the motion classifier 312 is indicative of the first mode (e.g., the browsing mode), control of the example method 400 proceeds to block 408. If the mode manager 314 instead determines at block 406 that the classification made by the motion classifier 312 is indicative of the second mode (e.g., the learning mode), control of the example method 400 proceeds to block 412.

At block 408, the example mode manager 314 of the mobile device 102 of FIG. 3 activates and/or executes the first mode (e.g., the browsing mode) of the dual-mode augmented reality interface of the mobile device 102 of FIGS. 1 and 3 (block 408). Following block 408, control of the example method 400 of FIG. 4 proceeds to block 410.

At block 410, the example user interface 324 of the mobile device 102 of FIG. 3 presents the first mode (e.g., the browsing mode) of the dual-mode augmented reality interface of the mobile device 102 of FIGS. 1 and 3 (block 410). For example, the user interface 324 may present the first mode (e.g., the browsing mode) of the dual-mode augmented reality interface via an output device 338 of the user interface 324 such as the example touchscreen display 106 of the mobile device 102, as shown in FIG. 1. An example method that may be used to implement block 410 is described in greater detail below in connection with FIG. 7. Following block 410, control of the example method 400 of FIG. 4 proceeds to block 416.

At block 412, the example mode manager 314 of the mobile device 102 of FIG. 3 activates and/or executes the second mode (e.g., the learning mode) of the dual-mode augmented reality interface of the mobile device 102 of FIGS. 2 and 3 (block 412). Following block 412, control of the example method 400 of FIG. 4 proceeds to block 414.

At block 414, the example user interface 324 of the mobile device 102 of FIG. 3 presents the second mode (e.g., the learning mode) of the dual-mode augmented reality interface of the mobile device 102 of FIGS. 2 and 3 (block 414). For example, the user interface 324 may present the second mode (e.g., the learning mode) of the dual-mode augmented reality interface via an output device 338 of the user interface 324 such as the example touchscreen display 106 of the mobile device 102, as shown in FIG. 2. An example method that may be used to implement block 414 is described in greater detail below in connection with FIG. 8. Following block 414, control of the example method 400 of FIG. 4 proceeds to block 416.

At block 416, the example mode manager 314 of the mobile device 102 of FIG. 3 determines whether the activated session (e.g., the activated browsing mode and/or the activated learning mode) of the dual-mode augmented reality interface of the mobile device 102 of FIGS. 1-3 should be discontinued (block 416). For example, the mode manager 314 may receive one or more command(s), instruction(s) and/or signal(s) via the user interface 324 of the mobile device 102 of FIG. 3 indicating that the activated session of the dual-mode augmented reality interface should be discontinued (e.g., that execution and/or operation of the dual-mode augmented reality interface should cease and/or be terminated). If the mode manager 314 determines at block

416 that the activated session of the dual-mode augmented reality interface should not be discontinued, control of the example method 400 returns to block 402. If the mode manager 314 instead determines at block 416 that the activated session of the dual-mode augmented reality interface should be discontinued, the example method 400 ends.

Figure 5:
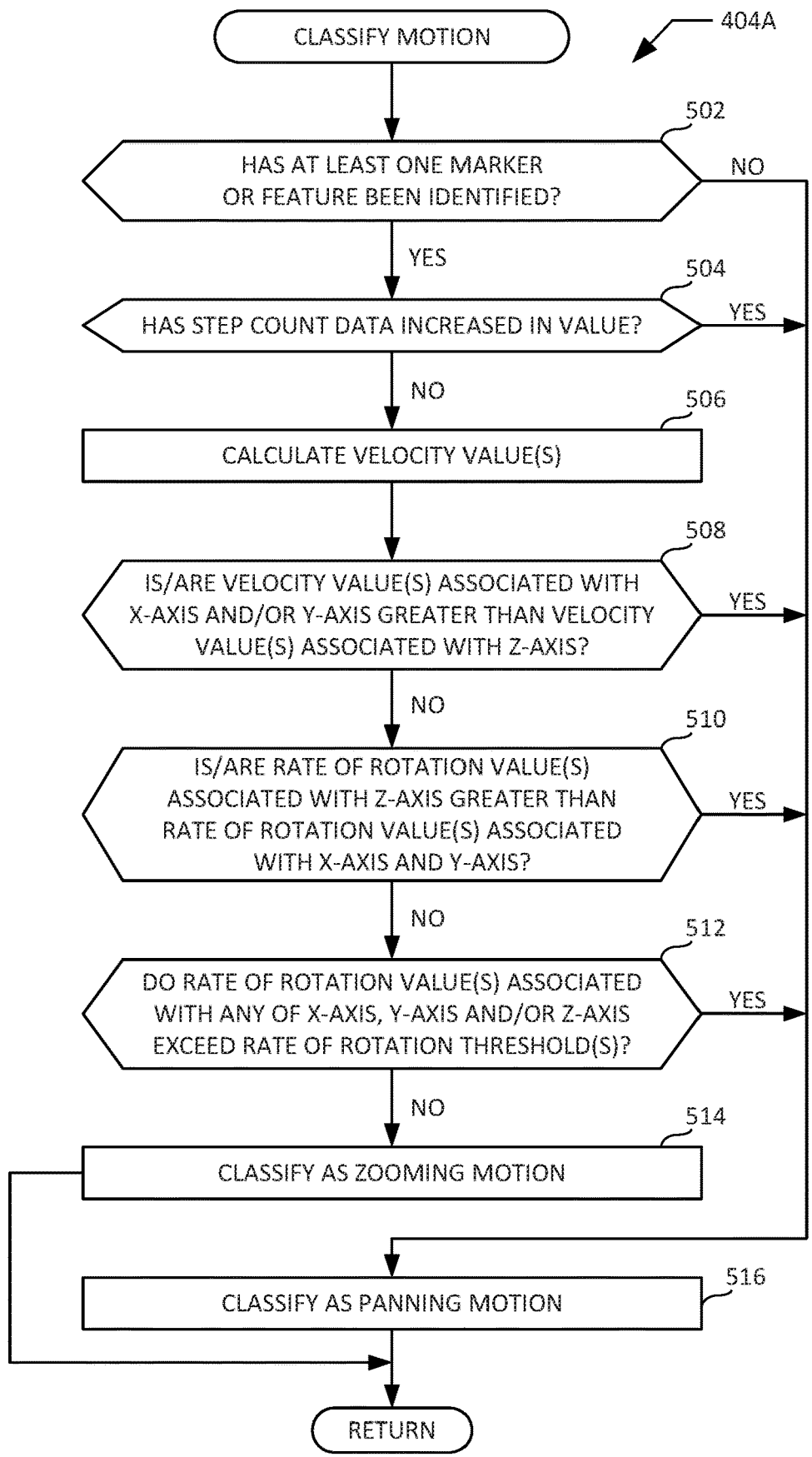
FIG. 5 is a flowchart representative of a first example method that may be executed at the example mobile device of FIGS. 1-3 to classify motion of the mobile device.

FIG. 5 is a flowchart representative of a first example method 404A that may be executed at the example mobile device 102 of FIGS. 1-3 to classify motion of the mobile device 102. Example operations of blocks 502, 504, 506, 508, 510, 512, 514 and 516 of FIG. 5 may be used to implement block 404 of FIG. 4.

The example method 404A begins when the example motion classifier 312 of FIG. 3 determines from the example marker identifier 316 of FIG. 3 and/or the example feature identifier 318 of FIG. 3 whether at least one maker or feature has been identified in the video or image captured by the camera 310 of FIG. 3 (block 502). Example processes for implementing block 502 to determine whether at least one marker or feature has been identified are described in greater detail below in connection with blocks 702, 704, 706, 708 and 710 of the example method of FIG. 7. If the motion classifier 312 determines at block 502 that at least one marker or feature has been identified, of the example method 404A proceeds to block 504. If the motion classifier 312 instead determines at block 502 that no marker or feature has been identified, control of the example method 404A proceeds to block 516.

At block 504, the example motion classifier 312 of FIG. 3 determines whether the step count data obtained from the pedometer 306 of the mobile device 102 of FIG. 3 has increased in value (block 504). If the motion classifier 312 determines at block 504 that the step count data obtained from the pedometer 306 has not increased in value, control of the example method 404A proceeds to block 506. If the motion classifier 312 instead determines at block 504 that the step count data obtained from the pedometer 306 has increased in value, control of the example method 404A proceeds to block 516.

At block 506, the example motion classifier 312 of FIG. 3 calculates velocity values based on the acceleration values obtained from the example accelerometer 302 of FIG. 3 (block 506). For example, the motion classifier 312 may calculate and/or determine velocity values associated with movement of the mobile device 102 by integrating the acceleration values detected by the accelerometer 302 of the mobile device 102 over time. Following block 506, control of the example method 404A proceeds to block 508.

At block 508, the example motion classifier 312 of FIG. 3 determines whether the velocity value(s) associated with either of the x-axis or the y-axis of the mobile device 102 is/are greater than the velocity value(s) associated with the z-axis of the mobile device 102 (block 508). If the motion classifier 312 determines at block 508 that the velocity value(s) associated with either of the x-axis or the y-axis of the mobile device 102 is/are not greater than the velocity value(s) associated with the z-axis of the mobile device 102, control of the example method 404A proceeds to block 510. If the motion classifier 312 instead determines at block 508 that the velocity value(s) associated with either of the x-axis or the y-axis of the mobile device 102 is/are greater than the velocity value(s) associated with the z-axis of the mobile device 102, control of the example method 404A proceeds to block 516.

At block 510, the example motion classifier 312 of FIG. 3 determines whether the rate of rotation value(s) associated with the z-axis of the mobile device 102 is/are greater than the rate of rotation value(s) associated with the x-axis and the y-axis of the mobile device 102 (block 510). If the motion classifier 312 determines at block 510 that the rate of rotation value(s) associated with the z-axis of the mobile device 102 is/are not greater than the rate of rotation value(s) associated with the x-axis and the y-axis of the mobile device 102, control of the example method 404A proceeds to block 512. If the motion classifier 312 instead determines at block 510 that the rate of rotation value(s) associated with the z-axis of the mobile device 102 is/are greater than the rate of rotation value(s) associated with the x-axis and the y-axis of the mobile device 102, control of the example method 404A proceeds to block 516.

At block 512, the example motion classifier 312 of FIG. 3 determines whether the rate of rotation value(s) associated with any of the x-axis, the y-axis and/or the z-axis of the mobile device 102 exceed one or more rate of rotation threshold(s) (block 512). If the motion classifier 312 determines at block 512 that the rate of rotation values associated with the x-axis, the y-axis and the z-axis of the mobile device 102 do not exceed the rate of rotation threshold(s), control of the example method 404A proceeds to block 514. If the motion classifier 312 instead determines at block 512 that one or more of the rate of rotation value(s) associated with any of the x-axis, the y-axis and/or the z-axis of the mobile device 102 exceed(s) the rate of rotation threshold(s), control of the example method 404A proceeds to block 516.

At block 514, the example motion classifier 312 of FIG. 3 classifies the motion of the mobile device 102 as the occurrence of a zooming motion (block 514). At block 514, the motion classifier of FIG. 3 may additionally and/or alternatively classify the motion of the mobile device 102 as the absence of a panning motion. Following block 514, the example method 404A ends and control returns to a calling function or process such as the example method 400 of FIG. 4.

At block 516, the example motion classifier 312 of FIG. 3 classifies the motion of the mobile device 102 as the occurrence of a panning motion (block 516). Following block 516, the example method 404A ends and control returns to a calling function or process such as the example method 400 of FIG. 4.

Figure 6:
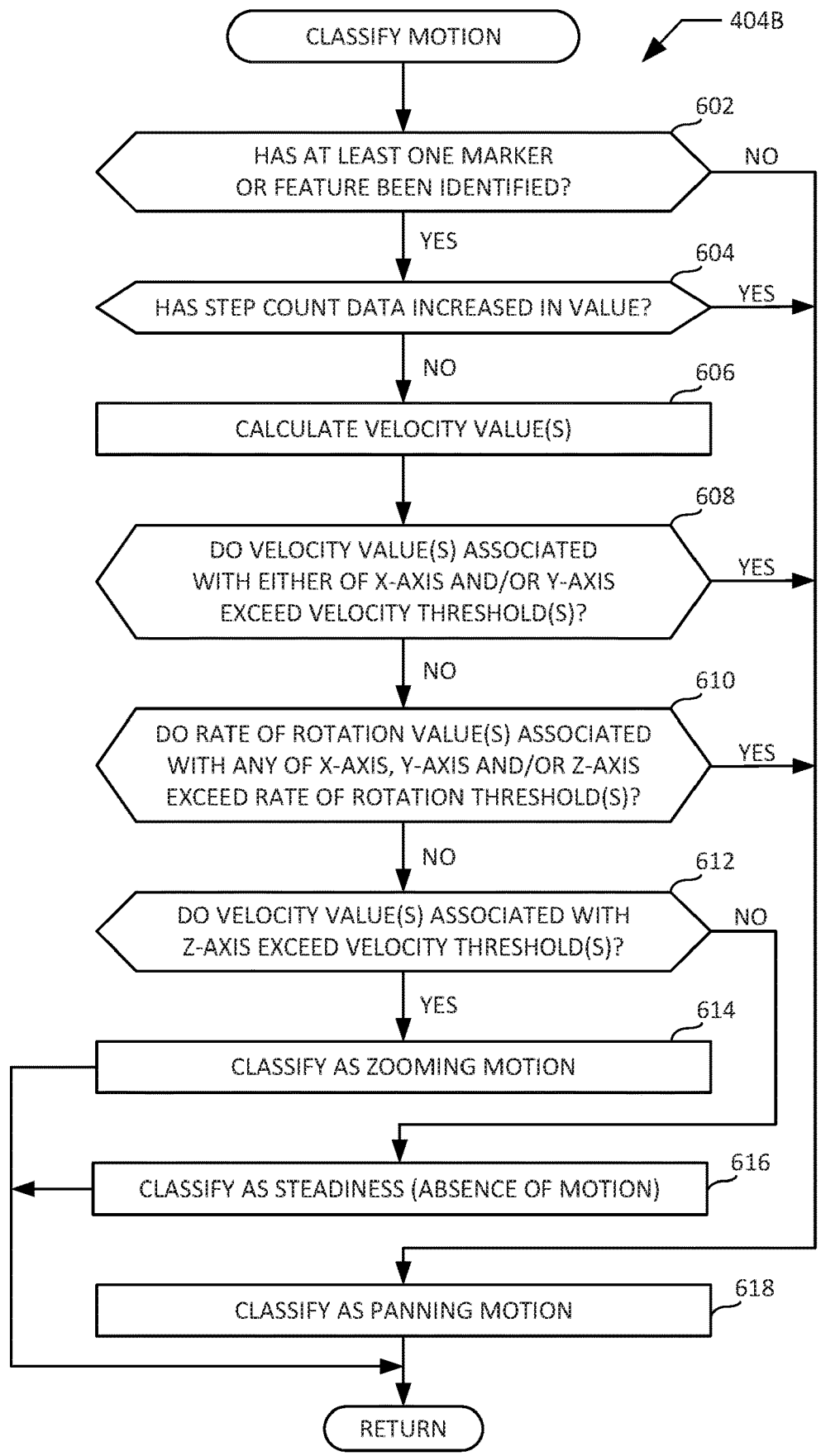
FIG. 6 is a flowchart representative of a second example method that may be executed at the example mobile device of FIGS. 1-3 to classify motion of the mobile device.

FIG. 6 is a flowchart representative of a second example method 404B that may be executed at the example mobile device 102 of FIGS. 1-3 to classify motion of the mobile device 102. Example operations of blocks 602, 604, 606, 608, 610, 612, 614, 616 and 618 of FIG. 6 may be used to implement block 404 of FIG. 4.

The example method 404B begins when the example motion classifier 312 of FIG. 3 determines from the example marker identifier 316 of FIG. 3 and/or the example feature identifier 318 of FIG. 3 whether at least one maker or feature has been identified in the video or image captured by the camera 310 of FIG. 3 (block 602). Example processes for implementing block 602 to determine whether at least one marker or feature has been identified are described in greater detail below in connection with blocks 702, 704, 706, 708 and 710 of the example method of FIG. 7. If the motion classifier 312 determines at block 602 that at least one marker or feature has been identified, of the example method 404B proceeds to block 604. If the motion classifier 312 instead determines at block 602 that no marker or feature has been identified, control of the example method 404B proceeds to block 618.

At block 604, the example motion classifier 312 of FIG. 3 determines whether the step count data obtained from the pedometer 306 of the mobile device 102 of FIG. 3 has increased in value (block 604). If the motion classifier 312 determines at block 604 that the step count data obtained from the pedometer 306 has not increased in value, control of the example method 404B proceeds to block 606. If the motion classifier 312 instead determines at block 604 that the step count data obtained from the pedometer 306 has increased in value, control of the example method 404B proceeds to block 618.

At block 606, the example motion classifier 312 of FIG. 3 calculates velocity values based on the acceleration values obtained from the example accelerometer 302 of FIG. 3 (block 606). For example, the motion classifier 312 may calculate and/or determine velocity values associated with movement of the mobile device 102 by integrating the acceleration values detected by the accelerometer 302 of the mobile device 102 over time. Following block 606, control of the example method 404B proceeds to block 608.

At block 608, the example motion classifier 312 of FIG. 3 determines whether the velocity value(s) associated with either of the x-axis or the y-axis of the mobile device 102 exceed one or more velocity threshold(s) (block 608). If the motion classifier 312 determines at block 604 that the velocity value(s) associated with the x-axis and the y-axis of the mobile device 102 do not exceed the acceleration threshold(s), control of the example method 404B proceeds to block 610. If the motion classifier 312 instead determines at block 608 that the velocity value(s) associated with either of the x-axis or the y-axis of the mobile device 102 exceed(s) the acceleration threshold(s), control of the example method 404B proceeds to block 618.

At block 610, the example motion classifier 312 of FIG. 3 determines whether the rate of rotation value(s) associated with any of the x-axis, the y-axis and/or the z-axis of the mobile device 102 exceed one or more rate of rotation threshold(s) (block 610). If the motion classifier 312 determines at block 512 that the rate of rotation values associated with the x-axis, the y-axis and the z-axis of the mobile device 102 do not exceed the rate of rotation threshold(s), control of the example method 404B proceeds to block 612. If the motion classifier 312 instead determines at block 610 that one or more of the rate of rotation value(s) associated with any of the x-axis, the y-axis and/or the z-axis of the mobile device 102 exceed(s) the rate of rotation threshold(s), control of the example method 404B proceeds to block 618.

At block 612, the example motion classifier 312 of FIG. 3 determines whether the velocity value(s) associated with the z-axis of the mobile device 102 exceed one or more velocity threshold(s) (block 612). If the motion classifier 312 determines at block 612 that one or more of the velocity value(s) associated with the z-axis of the mobile device 102 exceed(s) the velocity threshold(s), control of the example method 404B proceeds to block 614. If the motion classifier 312 instead determines at block 612 that the velocity value(s) associated with the z-axis of the mobile device 102 do not exceed the velocity threshold(s), control of the example method 404B proceeds to block 616.

At block 614, the example motion classifier 312 of FIG. 3 classifies the motion of the mobile device 102 as the occurrence of a zooming motion (block 614). At block 614, the motion classifier of FIG. 3 may additionally and/or alternatively classify the motion of the mobile device 102 as the absence of a panning motion. Following block 614, the example method 404B ends and control returns to a calling function or process such as the example method 400 of FIG. 4.

At block 616, the example motion classifier 312 of FIG. 3 classifies the motion of the mobile device 102 as the occurrence of a steadiness (block 616). The occurrence of a steadiness of the mobile device 102 corresponds to the absence of a panning motion and the absence of a zooming motion of the mobile device 102 (block 616). Following block 616, the example method 404B ends and control returns to a calling function or process such as the example method 400 of FIG. 4.

At block 618, the example motion classifier 312 of FIG. 3 classifies the motion of the mobile device 102 as the occurrence of a panning motion (block 618). Following block 618, the example method 404B ends and control returns to a calling function or process such as the example method 400 of FIG. 4.

Figure 7:
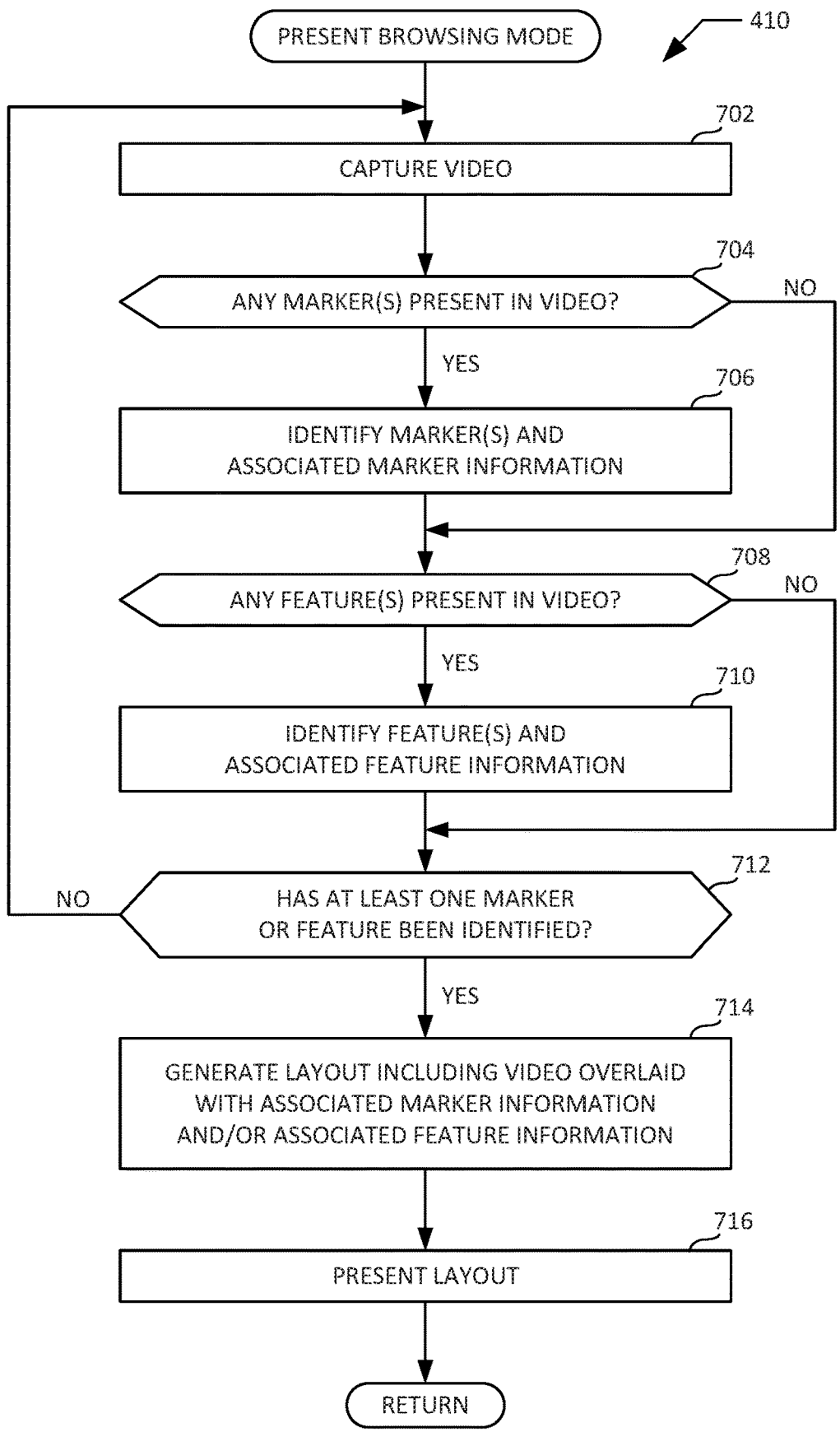
FIG. 7 is a flowchart representative of an example method that may be executed at the example mobile device of FIGS. 1 and 3 to present the example browsing mode of the example dual-mode augmented reality interface of the mobile device.

FIG. 7 is a flowchart representative of an example method 410 that may be executed at the example mobile device 102 of FIGS. 1 and 3 to present the example browsing mode (e.g., the first mode) of the example dual-mode augmented reality interface of the mobile device 102. Example operations of blocks 702, 704, 706, 708, 710, 712, 714 and 716 of FIG. 7 may be used to implement block 410 of FIG. 4.

The example method 410 begins when the example camera 310 of FIG. 3 captures video (block 702). For example, the camera 310 may capture video including the example object of interest 104 of FIG. 1. Following block 702, control of the example method 410 proceeds to block 704.

At block 704, the example marker identifier 316 of FIG. 3 determines whether the video captured by the camera 310 at block 702 includes any marker(s) (block 704). For example, the marker identifier 316 may determine that the video captured by the camera 310 includes the first example marker 114 and/or the second example marker 116 of the object of interest 104 of FIG. 1. If the marker identifier 316 determines at block 704 that the video captured by the camera 310 includes one or more marker(s), control of the example method 410 proceeds to block 706. If the marker identifier 316 instead determines at block 704 that the video captured by the camera 310 does not includes any marker(s), control of the example method 410 proceeds to block 708.

At block 706, the example marker identifier 316 of FIG. 3 identifies the marker(s) included in the video and also identifies any information associated with the identified marker(s) (block 706). For example, the marker identifier 316 may identify a first QR code corresponding to the first marker 108 of the object of interest 104 of FIG. 1 within the video of the object of interest 104 captured by the camera 310 of the mobile device 102. The marker identifier 316 may additionally identify information associated with the identified first QR code and/or the identified first marker 108 by accessing the marker library 330. As another example, the marker identifier 316 may identify a second QR code corresponding to the second marker 110 of the object of interest 104 of FIG. 1 within the video of the object of interest 104 captured by the camera 310 of the mobile device 102. The marker identifier 316 may additionally identify information associated with the identified second QR code and/or the identified second marker 110 by accessing the marker library 330. Following block 706, control of the example method 410 proceeds to block 708.

At block 708, the example feature identifier 318 of FIG. 3 determines whether the video captured by the camera 310 at block 702 includes any feature(s). For example, the feature identifier 318 may determine that the video captured by the camera 310 includes the example feature shape 118 of the object of interest 104 of FIG. 1. If the feature identifier 318 determines at block 708 that the video captured by the camera 310 includes one or more feature(s), control of the example method 410 proceeds to block 710. If the feature identifier 318 instead determines at block 708 that the video captured by the camera 310 does not includes any feature(s), control of the example method 410 proceeds to block 712.

At block 710, the example feature identifier 318 of FIG. 3 identifies the feature(s) included in the video and also identifies any information associated with the identified feature(s) (block 710). For example, the feature identifier 318 may identify a feature shape 118 corresponding to the third feature 112 of the object of interest 104 of FIG. 1 within the video of the object of interest 104 captured by the camera 310 of the mobile device 102. The feature identifier 318 may additionally identify information associated with the identified feature shape 118 and/or the identified third feature 112 by accessing the feature library 332. Following block 710, control of the example method 410 proceeds to block 712.

At block 712, the example layout manager 320 of FIG. 3 determines whether at least one marker or feature has been identified by the marker identifier 316 of FIG. 3 at block 706 or the feature identifier 318 of FIG. 3 at block 710 (block 712). If the layout manager 320 determines at block 712 that no marker(s) and no feature(s) have been identified, control of the example program 410 returns to block 702. If the layout manager 320 instead determines at block 712 that at least one marker or feature has been identified, control of the example program 410 proceeds to block 714.

At block 714, the example layout manager 320 generates a layout including the video captured by the camera 310 of FIG. 3 at block 702 overlaid with the associated marker information identified by the marker identifier 316 of FIG. 3 at block 706 and the associated feature information identified by the feature identifier 318 of FIG. 3 at block 710. For example, the layout manager 320 may generate a layout that includes video (e.g., real-time video) corresponding to the video captured by the camera 310 of the mobile device 102 overlaid with information (e.g., text, graphics, links to audio files, links to video files, etc.) corresponding to the data communicated to the layout manager 320 by the marker identifier 316 and/or the feature identifier 318. In some examples, the overlaid information may include indicators representative of the data communicated to the layout manager 320 by the marker identifier 316 and/or the feature identifier 318. For example, the overlaid information may include the first, second and third indicators 128, 130, 132 as described above in connection with the browsing mode of FIG. 1. Following block 714, control of the example method 410 proceeds to block 716.

At block 716, the example user interface 324 of FIG. 3 presents the layout generated by the layout manager 320 of FIG. 3 at block 714 (block 716). For example, the user interface 324 may present the layout generated by the layout manager 320 via an output device 338 of the user interface 324 such as the example touchscreen display 106 of the mobile device 102 of FIG. 1. Following block 716, the example method 410 ends and control returns to a calling function or process such as the example method 400 of FIG. 4.

Figure 8:
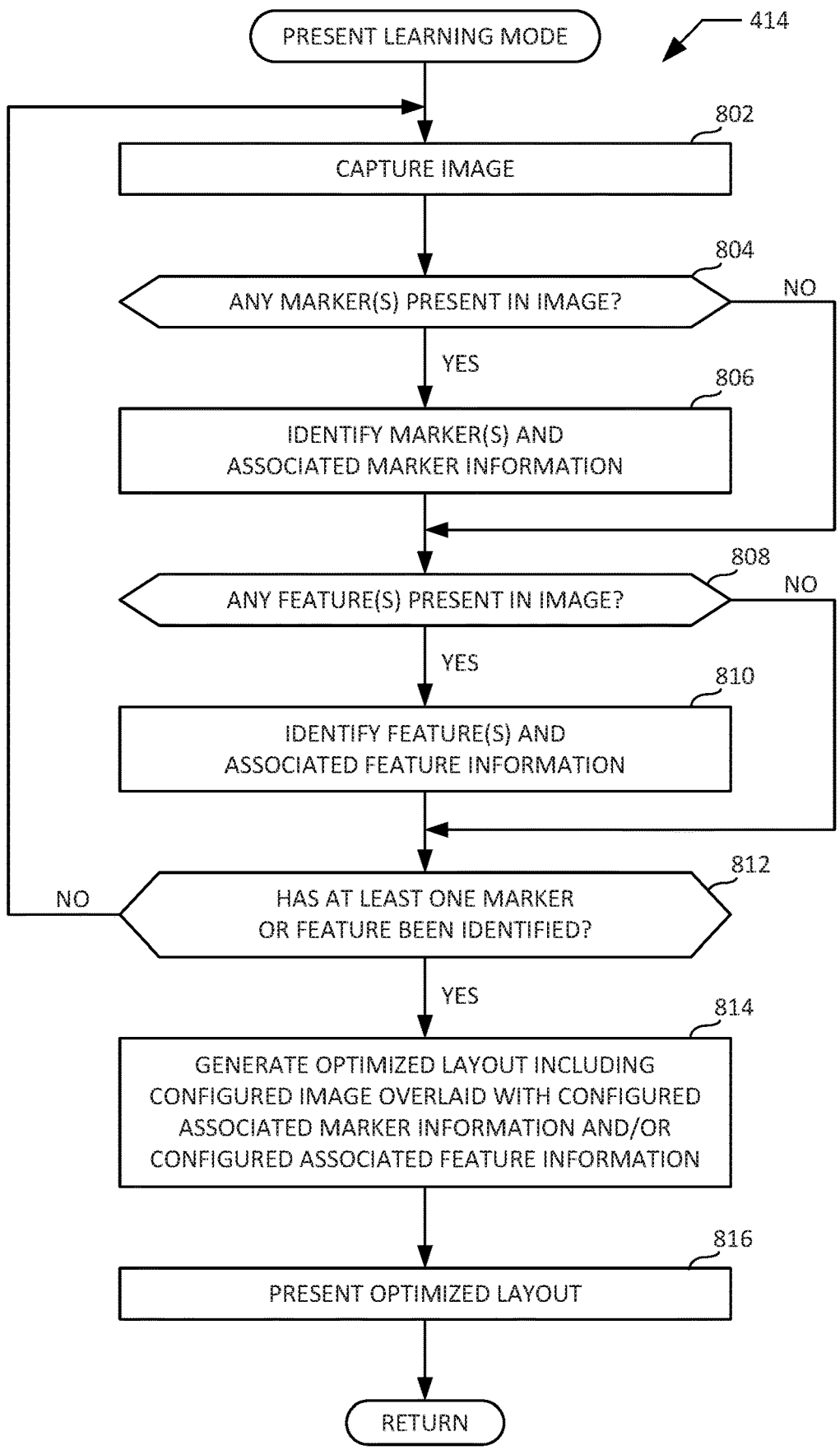
FIG. 8 is a flowchart representative of an example method that may be executed at the example mobile device of FIGS. 2 and 3 to present the example learning mode of the example dual-mode augmented reality interface of the mobile device.
Figure 9:
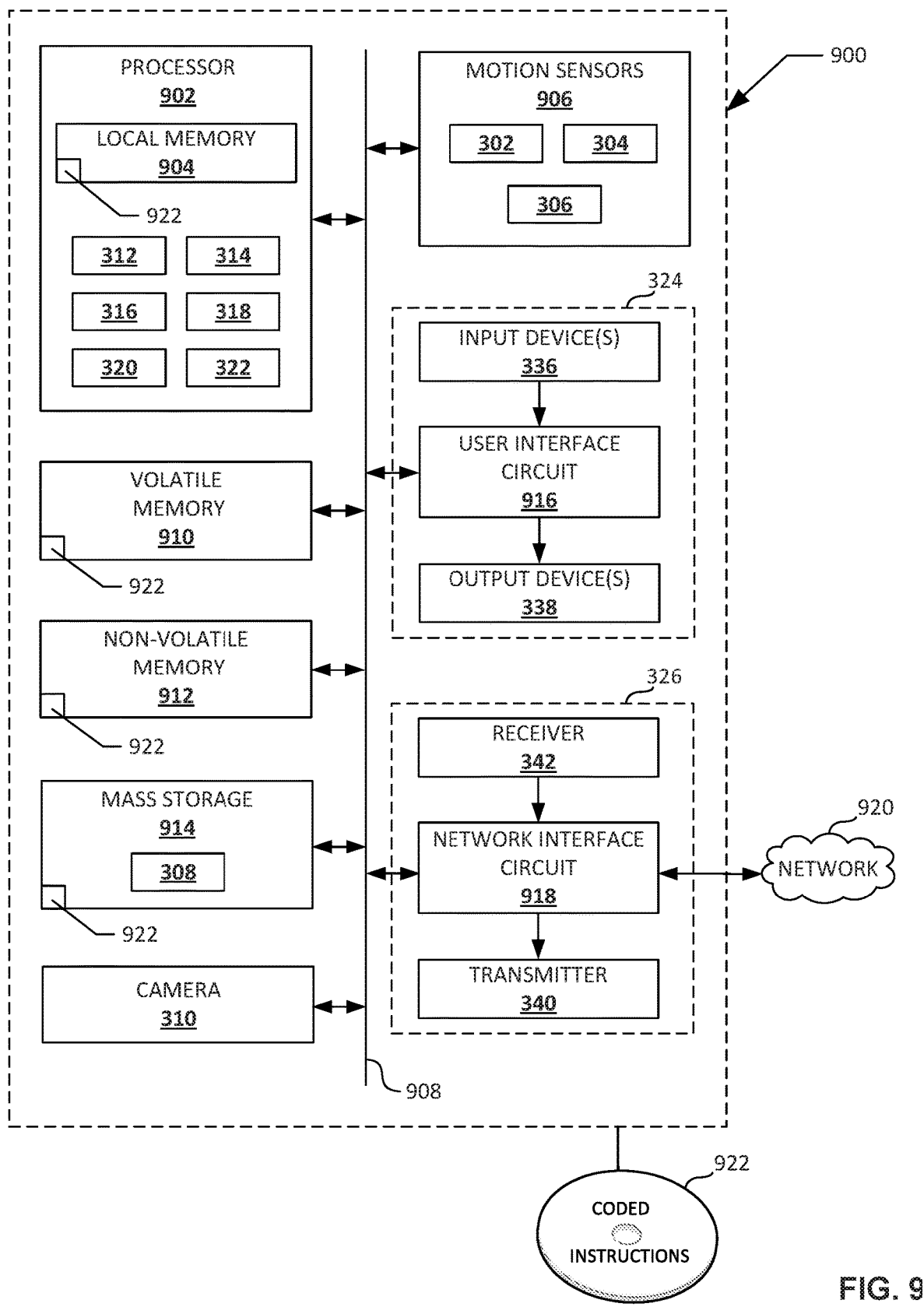
FIG. 9 is an example processor platform capable of executing instructions to implement the methods of FIGS. 4-8 and the example dual-mode augmented reality interface of the example mobile device of FIGS. 1-3.

FIG. 8 is a flowchart representative of an example method 414 that may be executed at the example mobile device 102 of FIGS. 2 and 3 to present the example learning mode (e.g., the second mode) of the example dual-mode augmented reality interface of the mobile device 102. Example operations of blocks 802, 804, 806, 808, 810, 812, 814 and 816 of FIG. 8 may be used to implement block 414 of FIG. 4.

The example method 414 begins when the example camera 310 of FIG. 3 captures an image (block 802). For example, the camera 310 may capture an image including the example object of interest 104 of FIG. 1. Following block 802, control of the example method 414 proceeds to block 804.

At block 804, the example marker identifier 316 of FIG. 3 determines whether the image captured by the camera 310 at block 802 includes any marker(s) (block 804). For example, the marker identifier 316 may determine that the image captured by the camera 310 includes the first example marker 114 and/or the second example marker 116 of the object of interest 104 of FIG. 1. If the marker identifier 316 determines at block 804 that the image captured by the camera 310 includes one or more marker(s), control of the example method 414 proceeds to block 806. If the marker identifier 316 instead determines at block 804 that the image captured by the camera 310 does not includes any marker(s), control of the example method 414 proceeds to block 808.

At block 806, the example marker identifier 316 of FIG. 3 identifies the marker(s) included in the image and also identifies any information associated with the identified marker(s) (block 806). For example, the marker identifier 316 may identify a first QR code corresponding to the first marker 108 of the object of interest 104 of FIG. 2 within the image of the object of interest 104 captured by the camera 310 of the mobile device 102. The marker identifier 316 may additionally identify information associated with the identified first QR code and/or the identified first marker 108 by accessing the marker library 330. As another example, the marker identifier 316 may identify a second QR code corresponding to the second marker 110 of the object of interest 104 of FIG. 2 within the image of the object of interest 104 captured by the camera 310 of the mobile device 102. The marker identifier 316 may additionally identify information associated with the identified second QR code and/or the identified second marker 110 by accessing the marker library 330. Following block 806, control of the example method 414 proceeds to block 808.

At block 808, the example feature identifier 318 of FIG. 3 determines whether the image captured by the camera 310 at block 802 includes any feature(s). For example, the feature identifier 318 may determine that the image captured by the camera 310 includes the example feature shape 118 of the object of interest 104 of FIG. 1. If the feature identifier 318 determines at block 808 that the image captured by the camera 310 includes one or more feature(s), control of the example method 414 proceeds to block 810. If the feature identifier 318 instead determines at block 808 that the image captured by the camera 310 does not includes any feature(s), control of the example method 414 proceeds to block 812.

At block 810, the example feature identifier 318 of FIG. 3 identifies the feature(s) included in the image and also identifies any information associated with the identified feature(s) (block 810). For example, the feature identifier 318 may identify a feature shape 118 corresponding to the third feature 112 of the object of interest 104 of FIG. 2 within the image of the object of interest 104 captured by the camera 310 of the mobile device 102. The feature identifier 318 may additionally identify information associated with the identified feature shape 118 and/or the identified third feature 112 by accessing the feature library 332. Following block 810, control of the example method 414 proceeds to block 812.

At block 812, the example layout manager 320 of FIG. 3 determines whether at least one marker or feature has been identified by the marker identifier 316 of FIG. 3 at block 806 or the feature identifier 318 of FIG. 3 at block 810 (block 812). If the layout manager 320 determines at block 812 that no marker(s) and no feature(s) have been identified, control of the example program 414 returns to block 802. If the layout manager 320 instead determines at block 812 that at least one marker or feature has been identified, control of the example program 414 proceeds to block 814.

At block 814, the example layout manager 320 generates an optimized layout including a configured version of the image captured by the camera 310 of FIG. 3 at block 802 overlaid with a configured version of the associated marker information identified by the marker identifier 316 of FIG. 3 at block 806 and a configured version of the associated feature information identified by the feature identifier 318 of FIG. 3 at block 810. For example, the layout manager 320 may generate an optimized layout that includes an image captured by the camera 310 of the mobile device 102 overlaid with information (e.g., text, graphics, links to audio files, links to video files, etc.) corresponding to the data communicated to the layout manager 320 by the marker identifier 316 and/or the feature identifier 318. For example, the overlaid information may include the fourth, fifth and sixth indicators 202, 204, 206 as described above in connection with the learning mode of FIG. 2. The layout manager 320 optimizes the arrangement and/or organization of the overlaid information relative to any object of interest (e.g., the object of interest 104 of FIG. 1) that may be included within the image captured by the camera 310 of the mobile device 102. For example, the layout manager 320 may shift, resize and/or otherwise reposition the object of interest within the image, and may further arrange and/or position the overlaid information relative to the object of interest such that the overlaid information does not overlap, obstruct and/or otherwise interfere with the object of interest when the optimized layout generated by the layout manager 320 is presented via the example user interface 324 of the mobile device 102 (e.g., via the display 106 of the mobile device 102 as shown in FIG. 2) in conjunction with the second mode of the dual-mode augmented reality interface. In some examples, the layout manager 320 may optimize the arrangement and/or organization of the overlaid information by utilizing one or more layout and/or style template(s) (e.g., graphic design templates) accessed from the template library 334. Following block 814, control of the example method 414 proceeds to block 816.

At block 816, the example user interface 324 of FIG. 3 presents the optimized layout generated by the layout manager 320 of FIG. 3 at block 814 (block 816). For example, the user interface 324 may present the optimized layout generated by the layout manager 320 via an output device 338 of the user interface 324 such as the example touchscreen display 106 of the mobile device 102 of FIG. 2. Following block 816, the example method 414 ends and control returns to a calling function or process such as the example method 400 of FIG. 4.

FIG. 9 is an example processor platform 900 capable of executing instructions to implement the methods of FIGS. 4-8 and the example dual-mode augmented reality interface of the example mobile device 102 of FIGS. 1-3. The processor platform 900 of the illustrated example includes a processor 902. The processor 902 of the illustrated example is hardware. For example, the processor 902 can be implemented by one or more integrated circuit(s), logic circuit(s), microprocessor(s) or controller(s) from any desired family or manufacturer. The processor 902 of the illustrated example includes a local memory 904 (e.g., a cache), and further includes the example motion classifier 312, the example mode manager 314, the example marker identifier 316, the example feature identifier 318, the example layout manager 320 and the example media player 322 of FIG. 3.

The processor 902 of the illustrated example is in communication with one or more example motion sensors 906 via a bus 908. The example motion sensors 906 include the example accelerometer 302, the example gyroscope 304 and the example pedometer 306 of FIG. 3. The processor 902 of the illustrated example is also in communication with the example camera 310 of FIG. 3.

The processor 902 of the illustrated example is also in communication with a main memory including a volatile memory 910 and a non-volatile memory 912 via the bus 908. The volatile memory 910 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 912 may be implemented by flash memory and/or any other desired type of memory device. Access to the volatile memory 910 and the non-volatile memory 912 is controlled by a memory controller.

The processor 902 of the illustrated example is also in communication with one or more mass storage devices 914 for storing software and/or data. Examples of such mass storage devices 914 include floppy disk drives, hard drive disks, compact disk drives, Blu-ray disk drives, RAID systems, and digital versatile disk (DVD) drives. In the illustrated example, the mass storage device 914 includes the example memory 308 of FIG. 3.

The processor platform 900 of the illustrated example also includes a user interface circuit 916. The user interface circuit 916 may be implemented by any type of interface standard, such as an Ethernet interface, a universal serial bus (USB), and/or a PCI express interface. In the illustrated example, one or more input device(s) 336 are connected to the user interface circuit 916. The input device(s) 336 permit(s) a user to enter data and commands into the processor 902. The input device(s) 336 can be implemented by, for example, an audio sensor, a camera (still or video), a keyboard, a button, a mouse, a touchscreen, a track-pad, a trackball, isopoint, a voice recognition system, a microphone, and/or a liquid crystal display. One or more output device(s) 338 are also connected to the user interface circuit 916 of the illustrated example. The output device(s) 338 can be implemented, for example, by a light emitting diode, an organic light emitting diode, a liquid crystal display, a touchscreen and/or a speaker. The user interface circuit 916 of the illustrated example may, thus, include a graphics driver such as a graphics driver chip and/or processor. In the illustrated example, the input device(s) 336, the output device(s) 338 and the user interface circuit 916 collectively form the example user interface 324 of FIG. 3.

The processor platform 900 of the illustrated example also includes a network interface circuit 918. The network interface circuit 918 may be implemented by any type of interface standard, such as an Ethernet interface, a universal serial bus (USB), and/or a PCI express interface. In the illustrated example, the network interface circuit 918 includes the example transmitter 340 and the example receiver 342 of FIG. 3 to facilitate the exchange of data and/or signals with external machines (e.g., a remote server) via a network 920 (e.g., a cellular network, a wireless local area network (WLAN), etc.).

Coded instructions 922 for implementing the methods of FIGS. 4-8 may be stored in the local memory 904, in the volatile memory 910, in the non-volatile memory 912, in the mass storage device 914, and/or on a removable tangible computer readable storage medium such as a CD or DVD.

From the foregoing, it will be appreciated that the disclosed dual-mode augmented reality interfaces provide advantages over conventional augmented reality interfaces that restrictively operate and/or execute in a single mode. The example dual-mode augmented reality interfaces for mobile devices disclosed herein advantageously operate and/or execute in a first mode (e.g., a browsing mode) in response to detecting an occurrence of a panning motion of the mobile device, and a second mode (e.g., a learning mode) in response to detecting an absence of a panning motion of the mobile device. In some disclosed examples, the second mode of the dual-mode augmented reality interface, when presented, advantageously includes an optimized layout comprising a configured version of an image captured by the camera of the mobile device, and further comprising configured associated information corresponding to a marker or a feature detected in the image. In some disclosed examples, the configured version of the image includes at least one of a modified size or a modified position of an object of interest modified relative to a size or a position of the object of interest within the image as captured. In some disclosed examples, the configured associated information overlays the configured version of the image without obstructing the object of interest contained therein. Thus, the disclosed dual-mode augmented reality interfaces remedy the disadvantages that arise from single-mode conventional augmented reality interfaces which present a user with modified and/or augmented real-time video in all instances.

In some examples, a method for presenting a dual-mode augmented reality interface of a mobile device is disclosed. In some disclosed examples, the method comprises presenting a first mode of the dual-mode augmented reality interface via a user interface of the mobile device in response to detecting an occurrence of a first motion of the mobile device. In some disclosed examples, the method comprises presenting a second mode of the dual-mode augmented reality interface via the user interface in response to detecting an absence of the first motion. In some disclosed examples, the second mode is different from the first mode. In some disclosed examples, the first mode is a browsing mode and the second mode is a learning mode. In some disclosed examples, the first motion is a panning motion.

In some disclosed examples of the method, the method comprises presenting the second mode via the user interface in response to detecting an occurrence of a second motion of the mobile device concurrently with the absence of the first motion. In some disclosed examples, the second motion is different from the first motion. In some disclosed examples, the second motion is a zooming motion. In some disclosed examples, the absence of the first motion together with an absence of the second motion is indicative of a steadiness of the mobile device.

In some disclosed examples of the method, the detecting of the occurrence of the first motion or the detecting of the absence of the first motion is based on data obtained from at least one of an accelerometer of the mobile device, a gyroscope of the mobile device, or a pedometer of the mobile device.

In some disclosed examples of the method, the presenting of the first mode includes presenting a layout. In some disclosed examples, the layout comprises video captured by a camera of the mobile device. In some disclosed examples, the layout further comprises associated information corresponding to a marker or a feature detected in the video. In some disclosed examples, the associated information overlays the video.

In some disclosed examples of the method, the presenting of the second mode includes presenting an optimized layout. In some disclosed examples, the optimized layout comprises a configured version of an image captured by a camera of the mobile device. In some disclosed examples, the image includes an object of interest. In some disclosed examples, the configured version of the image includes at least one of a modified size or a modified position of the object of interest modified relative to a size or a position of the object of interest within the image as captured by the camera. In some disclosed examples, the optimized layout comprises associated information corresponding to a marker or a feature detected in the image as captured by the camera. In some disclosed examples, the associated information overlays the configured version of the image without obstructing the object of interest.

In some examples, a dual-mode augmented reality interface of a mobile device is disclosed. In some disclosed examples, the dual-mode augmented reality interface comprises a first mode to be presented via a user interface of the mobile device in response to detecting an occurrence of a first motion of the mobile device. In some disclosed examples, dual-mode augmented reality interface comprises a second mode to be presented via the user interface in response to detecting an absence of the first motion. In some disclosed examples, the second mode is different from the first mode. In some disclosed examples, the first mode is a browsing mode and the second mode is a learning mode. In some disclosed examples, the first motion is a panning motion.

In some disclosed examples of the dual-mode augmented reality interface, the second mode of the dual-mode augmented reality interface is to be presented via the user interface in response to detecting an occurrence of a second motion of the mobile device concurrently with the absence of the first motion. In some disclosed examples, the second motion is different from the first motion. In some disclosed examples, the second motion is a zooming motion. In some disclosed examples, the absence of the first motion together with an absence of the second motion is indicative of a steadiness of the mobile device.

In some disclosed examples of the dual-mode augmented reality interface, the detecting of the occurrence of the first motion or the detecting of the absence of the first motion is based on data obtained from at least one of an accelerometer of the mobile device, a gyroscope of the mobile device, or a pedometer of the mobile device.

In some disclosed examples of the dual-mode augmented reality interface, the first mode of the dual-mode augmented reality interface, when presented, includes a layout. In some disclosed examples, the layout comprises video captured by a camera of the mobile device. In some disclosed examples, the layout further comprises associated information corresponding to a marker or a feature detected in the video. In some disclosed examples, the associated information overlays the video.

In some disclosed examples of the dual-mode augmented reality interface, the second mode of the dual-mode augmented reality interface, when presented, includes an optimized layout. In some disclosed examples, the optimized layout comprises a configured version of an image captured by a camera of the mobile device. In some disclosed examples, the image includes an object of interest. In some disclosed examples, the configured version of the image includes at least one of a modified size or a modified position of the object of interest modified relative to a size or a position of the object of interest within the image as captured by the camera. In some disclosed examples, the optimized layout comprises associated information corresponding to a marker or a feature detected in the image as captured by the camera. In some disclosed examples, the associated information overlays the configured version of the image without obstructing the object of interest.

In some examples, a tangible machine readable storage medium comprising instructions is disclosed. In some disclosed examples, the instructions, when executed, cause a processor to present a first mode of a dual-mode augmented reality interface of a mobile device via a user interface of the mobile device in response to detecting an occurrence of a first motion of the mobile device. In some disclosed examples, the instructions, when executed, cause the processor to present a second mode of the dual-mode augmented reality interface via the user interface in response to detecting an absence of the first motion. In some disclosed examples, the second mode is different from the first mode. In some disclosed examples, the first mode is a browsing mode and the second mode is a learning mode. In some disclosed examples, the first motion is a panning motion.

In some disclosed examples of the tangible machine readable storage medium, the instructions, when executed, further cause the processor to present the second mode of the dual-mode augmented reality interface via the user interface in response to detecting an occurrence of a second motion of the mobile device concurrently with the absence of the first motion. In some disclosed examples, the second motion is different from the first motion. In some disclosed examples, the second motion is a zooming motion. In some disclosed examples, the absence of the first motion together with an absence of the second motion is indicative of a steadiness of the mobile device.

In some disclosed examples of the tangible machine readable storage medium, the detecting of the occurrence of the first motion or the detecting of the absence of the first motion is based on data obtained from at least one of an accelerometer of the mobile device, a gyroscope of the mobile device, or a pedometer of the mobile device.

In some disclosed examples of the tangible machine readable storage medium, the first mode of the dual-mode augmented reality interface, when presented, includes a layout. In some disclosed examples, the layout comprises video captured by a camera of the mobile device. In some disclosed examples, the layout further comprises associated information corresponding to a marker or a feature detected in the video. In some disclosed examples, the associated information overlays the video.

In some disclosed examples of the tangible machine readable storage medium, the second mode of the dual-mode augmented reality interface, when presented, includes an optimized layout. In some disclosed examples, the optimized layout comprises a configured version of an image captured by a camera of the mobile device. In some disclosed examples, the image includes an object of interest. In some disclosed examples, the configured version of the image includes at least one of a modified size or a modified position of the object of interest modified relative to a size or a position of the object of interest within the image as captured by the camera. In some disclosed examples, the optimized layout comprises associated information corresponding to a marker or a feature detected in the image as captured by the camera. In some disclosed examples, the associated information overlays the configured version of the image without obstructing the object of interest.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    presenting a first augmented reality (AR) mode of a dual-mode AR interface via a user interface of a mobile device in response to detecting an occurrence of a panning motion of the mobile device, the first AR mode including a video-based overlay generated from a video of an object of interest, the video captured by a camera of the mobile device; and
    presenting a second AR mode of the dual-mode AR interface via the user interface in response to detecting an absence of the panning motion, the second AR mode being distinct from and presented in place of the first AR mode, the second AR mode including an image-based overlay generated from a static image of the object of interest, the static image captured by the camera, wherein the detecting of the absence of the panning motion includes:
        determining an x-axis velocity, a y-axis velocity, and a z-axis velocity associated with movement of the mobile device;
        determining an x-axis rate of rotation, a y-axis rate of rotation, and a z-axis rate of rotation associated with the movement of the mobile device;
        determining that the z-axis velocity is greater than the x-axis velocity, and greater than the y-axis velocity;
        determining that the z-axis rate of rotation is not greater than the x-axis rate of rotation, and not greater than the y-axis rate of rotation; and
        determining that the x-axis rate of rotation, the y-axis rate of rotation, and the z-axis rate of rotation respectively do not exceed a rate of rotation threshold.

2. The method of claim 1, wherein the first AR mode is a browsing mode associated with the object of interest, and the second AR mode is a learning mode associated with the object of interest.

3. The method of claim 1, further comprising presenting the second AR mode of the dual-mode AR interface via the user interface in response to detecting an occurrence of a zooming motion of the mobile device concurrently with the absence of the panning motion.

4. The method of claim 3, wherein the absence of the panning motion together with an absence of the zooming motion is indicative of a steadiness of the mobile device.

5. The method of claim 1, wherein the detecting of the occurrence of the panning motion or the detecting of the absence of the panning motion is based on data obtained from at least one of an accelerometer of the mobile device, a gyroscope of the mobile device, or a pedometer of the mobile device.

6. The method of claim 1, wherein presenting the first AR mode of the dual-mode AR interface includes presenting a layout, the layout comprising:
    the video captured by the camera of the mobile device; and
    associated information corresponding to a marker or a feature detected in the video, the associated information overlaying the video to form the video-based overlay.

7. The method of claim 1, wherein presenting the second AR mode of the dual-mode AR interface includes presenting an optimized layout, the optimized layout comprising:
 a configured version of the static image captured by the camera of the mobile device, the configured version of the static image including at least one of a modified size or a modified position of the object of interest modified relative to a size or a position of the object of interest within the static image as captured by the camera; and
 associated information corresponding to a marker or a feature detected in the static image as captured by the camera, the associated information overlaying the configured version of the static image, without obstructing the object of interest, to form the image-based overlay.

8. The method of claim 1, wherein the detecting of the occurrence of the panning motion includes detecting an increase in step count data obtained from a pedometer of the mobile device.

9. The method of claim 1, further comprising locking the dual-mode AR interface in the second AR mode in response to detecting a selection of a user-selectable icon included in the image-based overlay.

10. The method of claim 1, wherein the detecting of the absence of the panning motion further includes detecting that step count data obtained from a pedometer of the mobile device has not increased in value.

11. A dual-mode augmented reality (AR) interface of a mobile device, the dual-mode AR interface comprising:
 a first AR mode to be presented via a user interface of the mobile device in response to detecting an occurrence of a panning motion of the mobile device, the first AR mode including a video-based overlay generated from a video of an object of interest, the video captured by a camera of the mobile device; and
 a second AR mode to be presented via the user interface in response to detecting an absence of the panning motion, the second AR mode being distinct from and being presented in place of the first AR mode, the second AR mode including an image-based overlay generated from a static image of the object of interest, the static image captured by the camera, wherein the mobile device is configured to detect the absence of the panning motion by:
  determining an x-axis velocity, a y-axis velocity, and a z-axis velocity associated with movement of the mobile device;
  determining an x-axis rate of rotation, a y-axis rate of rotation, and a z-axis rate of rotation associated with the movement of the mobile device;
  determining that the z-axis velocity is greater than the x-axis velocity, and greater than the y-axis velocity;
  determining that the z-axis rate of rotation is not greater than the x-axis rate of rotation, and not greater than the y-axis rate of rotation; and determining that the x-axis rate of rotation, the y-axis rate of rotation, and the z-axis rate of rotation respectively do not exceed a rate of rotation threshold.

12. The dual-mode AR interface of claim 11, wherein the first AR mode is a browsing mode associated with the object of interest, and the second AR mode is a learning mode associated with the object of interest.

13. The dual-mode AR interface of claim 11, wherein the second AR mode is to be presented via the user interface in response to detecting an occurrence of a zooming motion of the mobile device concurrently with the absence of the panning motion.

14. The dual-mode AR interface of claim 11, wherein the detecting of the occurrence of the panning motion or the detecting of the absence of the panning motion is based on data obtained from at least one of an accelerometer of the mobile device, a gyroscope of the mobile device, or a pedometer of the mobile device.

15. The dual-mode AR interface of claim 11, wherein the first AR mode of the dual-mode AR interface, when presented, is to include a layout, the layout comprising:
 the video captured by the camera of the mobile device; and
 associated information corresponding to a marker or a feature detected in the video, the associated information overlaying the video to form the video-based overlay.

16. The dual-mode AR interface of claim 11, wherein the second AR mode of the dual-mode AR interface, when presented, includes an optimized layout, the optimized layout comprising:
 a configured version of the static image captured by the camera of the mobile device, the configured version of the static image including at least one of a modified size or a modified position of the object of interest modified relative to a size or a position of the object of interest within the static image as captured by the camera; and
 associated information corresponding to a marker or a feature detected in the static image as captured by the camera, the associated information overlaying the configured version of the static image, without obstructing the object of interest, to form the image-based overlay.

17. The dual-mode AR interface of claim 11, wherein the detecting of the occurrence of the panning motion includes detecting an increase in step count data obtained from a pedometer of the mobile device.

18. The dual-mode AR interface of claim 11, wherein the image-based overlay of the second AR mode includes a user-selectable icon that, when selected, locks the dual-mode AR interface in the second AR mode.

19. A non-transitory machine readable storage medium comprising instructions that, when executed, cause a processor to at least:
 present a first augmented reality (AR) mode of a dual-mode AR interface of a mobile device via a user interface of the mobile device in response to detecting an occurrence of a panning motion of the mobile device, the first AR mode including a video-based overlay generated from a video of an object of interest, the video captured by a camera of the mobile device; and
 present a second AR mode of the dual-mode AR interface via the user interface in response to detecting an absence of the panning motion, the second AR mode being distinct from and being presented in place of the first AR mode, the second AR mode including an image-based overlay generated from a static image of the object of interest, the static image captured by the camera, wherein the detecting of the absence of the panning motion includes:
  determining an x-axis velocity, a y-axis velocity, and a z-axis velocity associated with movement of the mobile device;
  determining an x-axis rate of rotation, a y-axis rate of rotation, and a z-axis rate of rotation associated with the movement of the mobile device;
  determining that the z-axis velocity is greater than the x-axis velocity, and greater than the y-axis velocity;

determining that the z-axis rate of rotation is not greater than the x-axis rate of rotation, and not greater than the y-axis rate of rotation; and
determining that the x-axis rate of rotation, the y-axis rate of rotation, and the z-axis rate of rotation respectively do not exceed a rate of rotation threshold.

20. The non-transitory machine readable storage medium of claim 19, wherein the first AR mode is a browsing mode associated with the object of interest, and the second AR mode is a learning mode associated with the object of interest.

21. The non-transitory machine readable storage medium of claim 19, wherein the instructions, when executed, further cause the processor to present the second AR mode via the user interface in response to detecting an occurrence of a zooming motion of the mobile device concurrently with the absence of the panning motion.

22. The non-transitory machine readable storage medium of claim 19, wherein the detecting of the occurrence of the panning motion or the detecting of the absence of the panning motion is based on data obtained from at least one of an accelerometer of the mobile device, a gyroscope of the mobile device, or a pedometer of the mobile device.

23. The non-transitory machine readable storage medium of claim 19, wherein the first AR mode of the dual-mode AR interface, when presented, includes a layout, the layout comprising:
the video captured by the camera of the mobile device; and
associated information corresponding to a marker or a feature detected in the video, the associated information overlaying the video to form the video-based overlay.

24. The non-transitory machine readable storage medium of claim 19, wherein the second AR mode of the dual-mode AR interface, when presented, includes an optimized layout, the optimized layout comprising:
a configured version of the static image captured by the camera of the mobile device, the configured version of the static image including at least one of a modified size or a modified position of the object of interest modified relative to a size or a position of the object of interest within the static image as captured by the camera; and
associated information corresponding to a marker or a feature detected in the static image as captured by the camera, the associated information overlaying the configured version of the static image, without obstructing the object of interest, to form the image-based overlay.

25. The non-transitory machine readable storage medium of claim 19, wherein the detecting of the occurrence of the panning motion includes detecting an increase in step count data obtained from a pedometer of the mobile device.

26. The non-transitory machine readable storage medium of claim 19, wherein the instructions, when executed, further cause the processor to lock the dual-mode AR interface in the second AR mode in response to detecting a selection of a user-selectable icon included in the image-based overlay.

27. A method, comprising:
presenting a first augmented reality (AR) mode of a dual-mode AR interface via a user interface of a mobile device in response to detecting an occurrence of a panning motion of the mobile device, the first AR mode including a video-based overlay generated from a video of an object of interest, the video captured by a camera of the mobile device; and
presenting a second AR mode of the dual-mode AR interface via the user interface in response to detecting an absence of the panning motion, the second AR mode being distinct from and presented in place of the first AR mode, the second AR mode including an image-based overlay generated from a static image of the object of interest, the static image captured by the camera, wherein the detecting of the absence of the panning motion includes:
determining an x-axis velocity, a y-axis velocity, and a z-axis velocity associated with movement of the mobile device;
determining an x-axis rate of rotation, a y-axis rate of rotation, and a z-axis rate of rotation associated with the movement of the mobile device;
determining that the x-axis velocity and the y-axis velocity respectively do not exceed a first velocity threshold;
determining that the x-axis rate of rotation, the y-axis rate of rotation, and the z-axis rate of rotation respectively do not exceed a rate of rotation threshold; and
determining that the z-axis velocity exceeds a second velocity threshold.

28. The method of claim 27, wherein the detecting of the absence of the panning motion further includes detecting that step count data obtained from a pedometer of the mobile device has not increased in value.

29. A dual-mode augmented reality (AR) interface of a mobile device, the dual-mode AR interface comprising:
a first AR mode to be presented via a user interface of the mobile device in response to detecting an occurrence of a panning motion of the mobile device, the first AR mode including a video-based overlay generated from a video of an object of interest, the video captured by a camera of the mobile device; and
a second AR mode to be presented via the user interface in response to detecting an absence of the panning motion, the second AR mode being distinct from and being presented in place of the first AR mode, the second AR mode including an image-based overlay generated from a static image of the object of interest, the static image captured by the camera, wherein the mobile device is configured to detect the absence of the panning motion by:
determining an x-axis velocity, a y-axis velocity, and a z-axis velocity associated with movement of the mobile device;
determining an x-axis rate of rotation, a y-axis rate of rotation, and a z-axis rate of rotation associated with the movement of the mobile device;
determining that the x-axis velocity and the y-axis velocity respectively do not exceed a first velocity threshold;
determining that the x-axis rate of rotation, the y-axis rate of rotation, and the z-axis rate of rotation respectively do not exceed a rate of rotation threshold; and
determining that the z-axis velocity exceeds a second velocity threshold.

30. A non-transitory machine readable storage medium comprising instructions that, when executed, cause a processor to at least:
present a first augmented reality (AR) mode of a dual-mode AR interface of a mobile device via a user interface of the mobile device in response to detecting an occurrence of a panning motion of the mobile device, the first AR mode including a video-based overlay generated from a video of an object of interest, the video captured by a camera of the mobile device; and present a second AR mode of the dual-mode AR interface via the user interface in response to detecting an absence of the panning motion, the second AR mode being distinct from and being presented in place of the first AR mode, the second AR mode including an image-based overlay generated from a static image of the object of interest, the static image captured by the camera, wherein the detecting of the absence of the panning motion includes:

determining an x-axis velocity, a y-axis velocity, and a z-axis velocity associated with movement of the mobile device;

determining an x-axis rate of rotation, a y-axis rate of rotation, and a z-axis rate of rotation associated with the movement of the mobile device;

determining that the x-axis velocity and the y-axis velocity respectively do not exceed a first velocity threshold;

determining that the x-axis rate of rotation, the y-axis rate of rotation, and the z-axis rate of rotation respectively do not exceed a rate of rotation threshold; and determining that the z-axis velocity exceeds a second velocity threshold.

\* \* \* \* \*